US011019572B2

(12) United States Patent
Zhang

(10) Patent No.: US 11,019,572 B2
(45) Date of Patent: *May 25, 2021

(54) METHOD AND DEVICE IN UE AND BASE STATION FOR POWER ADJUSTMENT

(71) Applicant: SHANGHAI LANGBO COMMUNICATION TECHNOLOGY COMPANY LIMITED, Shanghai (CN)

(72) Inventor: Xiaobo Zhang, Shanghai (CN)

(73) Assignee: SHANGHAI LANGBO COMMUNICATION TECHNOLOGY COMPANY LIMITED, Shanghai (CN)

(*) Notice: Subject to any disclaimer, the term of this patent is extended or adjusted under 35 U.S.C. 154(b) by 0 days.

This patent is subject to a terminal disclaimer.

(21) Appl. No.: 16/441,037

(22) Filed: Jun. 14, 2019

(65) Prior Publication Data
US 2019/0297581 A1 Sep. 26, 2019

Related U.S. Application Data

(63) Continuation of application No. PCT/CN2017/114556, filed on Dec. 5, 2017.

(30) Foreign Application Priority Data

Dec. 17, 2016 (CN) .......................... 201611174366.6

(51) Int. Cl.
H04W 4/00 (2018.01)
H04W 52/14 (2009.01)
(Continued)

(52) U.S. Cl.
CPC ............ H04W 52/143 (2013.01); H04B 7/04 (2013.01); H04B 7/0413 (2013.01);
(Continued)

(58) Field of Classification Search
None
See application file for complete search history.

(56) References Cited

U.S. PATENT DOCUMENTS

2012/0129566 A1 5/2012 Lee et al.
2014/0286219 A1* 9/2014 Siomina ............... H04J 11/0023
370/311
(Continued)

FOREIGN PATENT DOCUMENTS

CN 102045823 A 5/2011
CN 103718621 A 4/2014
(Continued)

OTHER PUBLICATIONS

ISR received in application No. PCT/CN2017/114556 dated Mar. 6, 2018.
(Continued)

Primary Examiner — Phirin Sam
(74) Attorney, Agent, or Firm — Maschoff Brennan

(57) ABSTRACT

The disclosure provides a method and a device in a UE and a base station for power adjustment. The UE transmits a first radio signal in a first time window, wherein the first radio signal is used for determining K difference value(s) corresponding to K reference power(s), and the reference power is a power estimated for transmission of an uplink channel. Measurement(s) for K antenna port group(s) are used for determining the K reference power(s respectively), the first radio signal is used for determining position(s) of the K antenna port group(s) in L antenna port groups, the antenna port group comprises a positive integer number of antenna ports, and all antenna ports in the L antenna port groups are used for one same serving cell. The disclosure can support multiple independent closed-loop power control processes
(Continued)

for one serving cell or carrier, thereby improving efficiency and performance of uplink power control.

20 Claims, 10 Drawing Sheets

(51) Int. Cl.
| | |
|---|---|
| H04L 1/00 | (2006.01) |
| H04L 1/18 | (2006.01) |
| H04L 5/00 | (2006.01) |
| H04W 52/24 | (2009.01) |
| H04W 52/32 | (2009.01) |
| H04W 80/02 | (2009.01) |
| H04W 88/08 | (2009.01) |
| H04W 72/04 | (2009.01) |
| H04B 7/04 | (2017.01) |
| H04B 7/0426 | (2017.01) |
| H04B 7/0413 | (2017.01) |
| H04W 52/36 | (2009.01) |
| H04B 7/06 | (2006.01) |
| H04W 72/08 | (2009.01) |

(52) U.S. Cl.
CPC ............ *H04B 7/0426* (2013.01); *H04B 7/06* (2013.01); *H04L 1/0003* (2013.01); *H04L 1/1819* (2013.01); *H04L 5/005* (2013.01); *H04W 52/242* (2013.01); *H04W 52/325* (2013.01); *H04W 52/36* (2013.01); *H04W 72/04* (2013.01); *H04W 72/08* (2013.01); *H04W 80/02* (2013.01); *H04W 88/08* (2013.01); *Y02D 30/70* (2020.08)

(56) References Cited

U.S. PATENT DOCUMENTS

| | | | |
|---|---|---|---|
| 2015/0373626 A1* | 12/2015 | Yl | H04W 48/12 |
| | | | 375/132 |
| 2016/0309424 A1 | 10/2016 | Dinan | |
| 2017/0048838 A1* | 2/2017 | Chrisikos | H04W 48/16 |
| 2019/0335402 A1* | 10/2019 | Zhang | H04B 7/0413 |

FOREIGN PATENT DOCUMENTS

| | | |
|---|---|---|
| CN | 103765966 A | 4/2014 |
| CN | 105766034 A | 7/2016 |

OTHER PUBLICATIONS

CN 1st Office Action received in application No. 201611174366.6 dated Sep. 28, 2018.
CN 1st Search Report received in application No. 201611174366.6 dated Sep. 19, 2018.
CN Notice of Allowance received in application No. 201611174366.6 dated Dec. 7, 2018.

\* cited by examiner

METHOD AND DEVICE IN UE AND BASE STATION FOR POWER ADJUSTMENT

CROSS-REFERENCE TO RELATED APPLICATION

This application is a continuation of International Application No. PCT/CN2017/114556, filed Dec. 5, 2017, claiming the priority benefit of Chinese Patent Application Serial Number 201611174366.6, filed on Dec. 17, 2016, the full disclosure of which is incorporated herein by reference.

BACKGROUND

Technical Field

The disclosure relates to transmission methods and devices supporting power adjustment in wireless communication systems, and in particular to a transmission scheme and device supporting power adjusting in a wireless communication system having a large number of antennas deployed on a base station side.

Related Art

In existing Long Term Evolution (LTE) systems, Power Headroom Reporting (PHR) is used by an eNB to acquire a difference between a nominal maximum transmit power of a User Equipment (UE) and an estimated power for transmission of an UL-SCH on an activated serving cell.

Massive Multi-Input Multi-Output (MIMO) becomes a research hotspot of next-generation mobile communications. In the massive MIMO, multiple antennas experience beamforming to form a relatively narrow beam which points to a particular direction to improve the quality of communication. Since the width of the beam is narrow, transmission paths experienced by beams pointing to different directions are different, resulting in significant differences in long-time channel fading between signals using different beamforming vectors. The differences in long-time channel fading bring a new problem to uplink power adjustment.

SUMMARY

The inventor finds through researches that in the condition that a base station employs multi-antenna beamforming based on massive MIMO, the adjustment of uplink power is related to receiving beamforming vectors of the base station, different receiving beamforming vectors need to correspond to different uplink power adjustment processes, and an uplink power offset specific to a certain receiving beamforming vector cannot be used by an uplink transmission based on another receiving beamforming vector, otherwise, inaccuracy and performance loss could be caused to the uplink power adjustment based on the another receiving beamforming vector.

The inventor finds through further researches that beam-specific power control can provide additional gains for massive MIMO. Further, the PHR mechanism also needs to be further enhanced so as to meet requirements of beam-specific power control.

It should be noted that although the disclosure is originally designed in view of massive antennas, the disclosure is also applicable to single-antenna scenarios.

The disclosure provides a solution in view of the above problems. It should be noted that the embodiments of the UE of the disclosure and the characteristics in the embodiments may be applied to the base station if no conflict is incurred, and vice versa. The embodiments of the disclosure and the characteristics in the embodiments may be mutually combined if no conflict is incurred.

The disclosure provides a method in a UE for power adjustment, wherein the method includes:

transmitting a first radio signal in a first time window.

Herein, the first radio signal is used for determining K difference value(s), and the K difference value(s) is (are one-to-one) corresponding to K reference power(s). The reference power is a power estimated for transmission of an uplink channel. Measurement(s) for K antenna port group(s) are used for determining the K reference power(s respectively). The first radio signal is used for determining position(s) of the K antenna port group(s) in L antenna port groups. The antenna port group includes a positive integer number of antenna port(s). All antenna ports in the L antenna port groups are used for one same serving cell, or all antenna ports in the L antenna port groups are used for one same carrier. The K is a positive integer, the L is a positive integer not less than the K, and the L is greater than 1.

In one embodiment, the first radio signal is a higher layer signaling, and the higher layer signaling indicates the K difference values.

In one embodiment, the higher layer signaling is a Media Access Control (MAC) signaling.

In one embodiment, the K is greater than 1.

In conventional PHR schemes, only one Power Headroom (PH) is reported at a given time for one serving cell. However, in the above embodiment, multiple difference values are reported at a given time for one serving cell. Further, since the K difference values are reported through a higher layer signaling, the above embodiment can avoid latency due to multiples times of reporting (that is, reporting one difference value each time).

In one embodiment, the L antenna port groups correspond to L antenna virtualization vectors respectively, and the antenna virtualization vector is used for analog beamforming of a corresponding antenna port group.

The above embodiment is suitable for beam-specific power control, and can provide more accurate PHRs for different beams of one serving cell.

In one embodiment, the antenna port is formed by multiple antennas through antenna virtualization superposition, and mapping coefficients from the multiple antennas to the antenna port constitute a beamforming vector. The beamforming vector is generated by a Kronecker product of an analog beamforming vector and a digital beamforming vector.

In one embodiment, the antenna port group is composed of one antenna port.

In one embodiment, the L antenna port groups include two antenna port groups, wherein the two antenna port groups include different numbers of antenna ports.

In one embodiment, the antenna port is a Channel Status Information Reference Signal (CSI-RS) port.

In one embodiment, the uplink channel is a transport channel.

In one embodiment, the uplink channel is an Uplink Shared Channel (UL-SCH).

In one embodiment, the difference value is a PH.

In one embodiment, the difference value is in unit of decibel (dB).

Specifically, according to one aspect of the disclosure, each of the K difference value(s) is equal to a difference between a first power and a corresponding reference power; or a first difference value is equal to a difference between a second power and a corresponding reference power, and each of the K difference value(s) other than the first difference value is equal to a difference between a first power and a corresponding reference power; or the K difference value(s) is (are one-to-one) corresponding to K target power(s), and the difference value is equal to a difference between a corresponding target power and a corresponding reference power.

In one embodiment, the first power, the second power, the reference power and the target power are all in unit of dBm.

In one embodiment, the first power is a maximum transmit power of the UE in the first time window on the serving cell corresponding to the L antenna port groups.

In one embodiment, the first power is a maximum transmit power of the UE in the first time window on the serving cell corresponding to the L antenna port groups, which is calculated according to TS36.101 when Maximum Power Reduction (MPR), Additional Maximum Power Reduction (A-MPR), Power Management Maximum Power Reduction (P-MPR) and Allowed operating band edge transmission power relaxation (ΔTc) are all equal to 0 dB. Herein, detailed introductions of the MPR, A-MPR, P-MPR and ΔTc can refer to TS36.101.

In one embodiment, the first power is $\tilde{P}_{CMAX,c}(i)$ in TS36.101, the first time window is a subframe i, the L antenna port groups transmit radio signals on a serving cell c, and the first power is a maximum transmit power of the UE in the subframe i of the serving cell c.

In one embodiment, each of the K difference value(s) is equal to a difference between a first power and a corresponding reference power.

In one embodiment, the first power is a maximum transmit power of the UE in the first time window on a serving cell corresponding to the K antenna port group(s).

In one embodiment, the first power is indicated by the first radio signal.

In one embodiment, a first difference value is equal to a difference between a second power and a corresponding reference power, and each of the K difference value(s) other than the first difference value is equal to a difference between a first power and a corresponding reference power.

In one embodiment, the second power is $\tilde{P}_{CMAX,c}(i)$ in TS36.101, the first time window is a subframe i, the L antenna port groups transmit radio signals on a serving cell c, and the first power is a maximum transmit power of the UE in the subframe i of the serving cell c.

In one embodiment, the K difference value(s) is (are one-to-one) corresponding to K target power(s), and the difference value is equal to a difference between a corresponding target power and a corresponding reference power.

The above embodiment enables the UE to be allocated with variable maximum transmit powers for different beams. Compared with existing technologies, the above embodiment can reduce inter-cell interference.

In one embodiment, the first power is a maximum transmit power of the UE in the first time window on a serving cell corresponding to the K antenna port group(s).

In one embodiment, the target power is indicated by the first radio signal.

In one embodiment, the target power is configured by a downlink signaling.

In one embodiment, the K reference powers include at most one reference power, that is, a first reference power, the first reference power is in linear correlation with at least one of {a first component, a third component}, the first component is related to a bandwidth occupied by the first radio signal, and the third component is related to an MCS of the first radio signal. A linear coefficient between the first reference power and the first component is 1, and a linear coefficient between the first reference power and the third component is 1.

In one embodiment, the first component is $10 \log_{10}(M_{PUSCH,c}(i))$, where the $M_{PUSCH,c}(i)$ is a bandwidth in unit of resource block which is allocated to a PUSCH in the ith subframe on a serving cell indexed with c, and the first radio signal is transmitted on the serving cell indexed with c. Specific definitions of the $M_{PUSCH,c}(i)$ can refer to TS36.213.

In one embodiment, the third component is $\Delta_{TF,c}(i)$, where the $\Delta_{TF,c}(i)$ is a power offset related to the MCS of the UE in the ith subframe on a serving cell indexed with c, and the first radio signal is transmitted on the serving cell indexed with c. Specific definitions of the $\Delta_{TF,c}(i)$ can refer to TS36.213.

In one embodiment, the third component is configured by a higher layer signaling.

In one embodiment, the third component is cell specific.

In one embodiment, the reference power is in linear correlation with a second component, and the second component is related to a scheduling type corresponding to the first radio signal. A linear coefficient between the first power and the second component is 1.

In one embodiment, the second component is $P_{O\_PUSCH,c}(j)$, the $P_{O\_PUSCH,c}(j)$ is a power offset related to a scheduling type indexed with j on a serving cell indexed with c, and the L antenna port groups are used for the serving cell indexed with c (that is, transmitting radio signals on the serving cell indexed with c). Specific definitions of the $P_{O\_PUSCH,c}(j)$ can refer to TS36.213.

In one embodiment, for the first reference power, the scheduling type includes {semi-persistent grant, dynamic scheduled grant, random access response grant}.

In one embodiment, for reference powers among the K reference powers other than the first reference power, the scheduling type is fixed as dynamic scheduled grant.

In one subembodiment, the second component is configured by a higher layer signaling.

In one subembodiment, the second component is cell specific.

Specifically, according to one aspect of the disclosure, the method further includes:
receiving L reference signal groups.

Herein, the L reference signal groups are transmitted by L antenna port groups respectively. Each of the L reference signal groups includes a positive integer number of reference signal(s), and reference signal(s) in the each reference signal group is (are one-to-one) corresponding to antenna port(s) in a corresponding transmitting antenna port group.

In one embodiment, the reference signal includes CSI-RS.

In one embodiment, the reference signal includes at least one of {a Primary Synchronization Signal (PSS), a Secondary Synchronization Signal (SSS)}.

In one embodiment, a pattern of the reference signal in a subframe is a pattern of CSI-RS in a subframe.

In one embodiment, the reference signal is transmitted by a corresponding antenna port.

Specifically, according to one aspect of the disclosure, the method further includes:
receiving a first signaling.

Herein, the first signaling indicates a time duration of a first timer, and the expiration of the first timer is used for triggering reporting of the K difference value(s).

In one embodiment, the first signaling is a Radio Resource Control (RRC) signaling.

In one embodiment, the first signaling is serving cell specific.

In one embodiment, the K is equal to the L, the first signaling is a periodicPHR-Timer field in a MAC-MainConfig IE (Information Element), and the first timer is a periodicPHR-Timer.

In the above embodiment, the expiration of the periodicPHR-Timer triggers L PHRs for one serving cell, unlike conventional schemes, which trigger only one PHR for one serving cell.

Specifically, according to one aspect of the disclosure, the method further includes:

receiving a second signaling.

Herein, the second signaling is used for determining a specific threshold. Measurements for the L reference signal groups are used for determining L path losses respectively. The specific threshold is used for determining the K antenna port group(s) from the L antenna port groups. K path loss(es) among the L path losses is (are) used for determining the K reference power(s respectively).

In one embodiment, the reference signal group is composed of one reference signal, and the path loss is equal to a transmit power of a corresponding reference signal minus a Reference Signal Received Power (RSRP) of the corresponding reference signal.

In one embodiment, the reference signal group is composed of multiple reference signals, and the path loss is equal to an average transmit power of reference powers in a corresponding reference signal group minus an average RSRP of reference signals in the corresponding reference signal group.

In one embodiment, the reference power and the corresponding path loss have a linear relationship.

In one subembodiment, a linear coefficient corresponding to the linear relationship is not greater than 1 but not less than 0.

In one subembodiment, a linear coefficient corresponding to the linear relationship is configurable.

In one embodiment, a linear coefficient between the reference power and the corresponding path loss is $\alpha_c(j)$, the $\alpha_c(j)$ is a partial path loss compensation factor related to the scheduling type indexed with j in a serving cell indexed with c, and the L antenna port groups are used for the serving cell indexed with c. Specific definitions of the $\alpha_c(j)$ can refer to TS36.213.

In one embodiment, for reference powers among the K reference powers other than the first reference power, the j is 1, that is, the scheduling type corresponding to the $\alpha_c(j)$ is dynamic scheduled grant.

In one embodiment, the second signaling is a higher layer signaling.

In one embodiment, the second signaling is a dl-Pathloss-Change field in a MAC-MainConfig IE.

In one embodiment, the specific threshold is in unit of dB.

In one embodiment, measurement(s) for the K reference signal group(s) is (are) used for determining the K path loss(es), and the K path loss(es) (all have) has change(s) greater than the specific threshold.

In one embodiment, measurements for the K reference signal group(s) is (are) used for determining the K path loss(es), the K path loss(es) (all have) has change(s) greater than the specific threshold, and path losses among the L path losses other than the K path losses have changes not greater than the specific threshold.

In one subembodiment, the first signaling is a prohibitPHR-Timer field in a MAC-MainConfig Information Element, and the first timer is a prohibitPHR-Timer.

Specifically, according to one aspect of the disclosure, the method further includes:

receiving R downlink signalings.

Herein, each of the R downlink signalings includes a first field and a second field. The R downlink signalings are used for one same serving cell, or, the R downlink signalings are used for one same carrier. The K reference power(s) is (are) one-to-one) corresponding to K index(es). For any one given reference power among the K reference power(s), the R downlink signalings include a total number of R1 downlink signalings in which the first fields have values equal to the index corresponding to the given reference power, the given reference power is in linear correlation with a summation of R1 power offsets, and the R1 power offsets are indicated by the second fields in the R1 downlink signalings respectively. The R is a positive integer, and the R1 is a positive integer not greater than the R. Each of the K index(es) is an integer.

In one embodiment, the above method has benefits that multiple independent uplink power control processes can be identified through the first fields in multiple downlink signalings, and power offsets for different power control processes cannot be superimposed on each other. Different indexes can correspond to different receiving beamforming vectors of the base station.

In one embodiment, any two of the K indexes are different.

In one embodiment, the downlink signaling is a dynamic signaling.

In one embodiment, the second field is a Transmitting Power Control (TPC) field.

In one embodiment, the value of the R1 is related to the index corresponding to the given reference power.

Specifically, according to one aspect of the disclosure, a third signaling is the latest downlink signaling among the R downlink signalings, the third signaling includes scheduling information of the first radio signal, and the scheduling information includes at least one of {occupied time domain resources, occupied frequency domain resources, an MCS, a HARQ process number, an RV, an NDI}.

In one embodiment, the first radio signal includes a first reference signal, and the first field in the third signaling is used for determining a Reference Signal (RS) sequence corresponding to the first reference signal.

In one embodiment, a first bit block is used for generating the first radio signal, and the first field in the third signaling is used for generating a scrambling sequence corresponding to the first bit block.

In one subembodiment, the first bit block includes a positive integer number of Transport Blocks (TBs).

In one embodiment, the first field in the third signaling has a value equal to one of the K indexes.

In one embodiment, the first field in the third signaling has a value different from all the K indexes.

Specifically, according to one aspect of the disclosure, the first radio signal is used for determining at least one of {the K, first indication information}, the first indication information being applied to the K difference values. The first indication information indicates whether a MAC entity employs power backoff, and the K is greater than 1.

In one embodiment, the power backoff is due to power management.

The disclosure provides a method in a base station for power adjustment, wherein the method includes:

receiving a first radio signal in a first time window.

Herein, the first radio signal is used for determining K difference value(s), and the K difference value(s) is (are) one-to-one) corresponding to K reference power(s). The reference power is a power estimated for transmission of an uplink channel. Measurement(s) for K antenna port group(s) are used for determining the K reference power(s respectively). The first radio signal is used for determining position(s) of the K antenna port group(s) in L antenna port groups. The antenna port group includes a positive integer number of antenna port(s). All antenna ports in the L antenna port groups are used for one same serving cell, or all antenna ports in the L antenna port groups are used for one same carrier. The K is a positive integer, the L is a positive integer not less than the K, and the L is greater than 1.

Specifically, according to one aspect of the disclosure, each of the K difference value(s) is equal to a difference between a first power and a corresponding reference power; or a first difference value is equal to a difference between a second power and a corresponding reference power, and each of the K difference value(s) other than the first difference value is equal to a difference between a first power and a corresponding reference power; or the K difference value(s) is (are one-to-one) corresponding to K target power(s), and the difference value is equal to a difference between a corresponding target power and a corresponding reference power.

Specifically, according to one aspect of the disclosure, the method further includes:

transmitting L reference signal groups.

Herein, the L reference signal groups are transmitted by L antenna port groups respectively. Each of the L reference signal groups includes a positive integer number of reference signal(s), and reference signal(s) in the each reference signal group is (are one-to-one) corresponding to antenna port(s) in a corresponding transmitting antenna port group.

Specifically, according to one aspect of the disclosure, the method further includes:

transmitting a first signaling.

Herein, the first signaling indicates a time duration of a first timer, and the expiration of the first timer is used for triggering reporting of the K difference value(s).

Specifically, according to one aspect of the disclosure, the method further includes:

transmitting a second signaling.

Herein, the second signaling is used for determining a specific threshold. Measurements for the L reference signal groups are used for determining L path losses respectively. The specific threshold is used for determining the K antenna port group(s) from the L antenna port groups. K path loss(es) among the L path losses is (are) used for determining the K reference power(s respectively).

Specifically, according to one aspect of the disclosure, the method further includes:

transmitting R downlink signalings.

Herein, each of the R downlink signalings includes a first field and a second field. The R downlink signalings are used for one same serving cell, or, the R downlink signalings are used for one same carrier. The K reference power(s) is (are one-to-one) corresponding to K index(es). For any one given reference power among the K reference power(s), the R downlink signalings include a total number of R1 downlink signalings in which the first fields have values equal to the index corresponding to the given reference power, the given reference power is in linear correlation with a summation of R1 power offsets, and the R1 power offsets are indicated by the second fields in the R1 downlink signalings respectively. The R is a positive integer, and the R1 is a positive integer not greater than the R. Each of the K index(es) is an integer.

Specifically, according to one aspect of the disclosure, a third signaling is the latest downlink signaling among the R downlink signalings, the third signaling includes scheduling information of the first radio signal, and the scheduling information includes at least one of {occupied time domain resources, occupied frequency domain resources, an MCS, a HARQ process number, an RV, an NDI}.

Specifically, according to one aspect of the disclosure, the first radio signal is used for determining at least one of {the K, first indication information}, the first indication information being applied to the K difference values. The first indication information indicates whether a MAC entity employs power backoff, and the K is greater than 1.

The disclosure provides a UE for power adjustment, wherein the UE includes:

a first receiver, to receive L reference signal groups; and a first transmitter, to transmit a first radio signal in a first time window.

Herein, the first radio signal is used for determining K difference value(s), and the K difference value(s) is (are one-to-one) corresponding to K reference power(s). The reference power is a power estimated for transmission of an uplink channel. Measurement(s) for K antenna port group(s) are used for determining the K reference power(s respectively). The first radio signal is used for determining position(s) of the K antenna port group(s) in L antenna port groups. The antenna port group includes a positive integer number of antenna port(s). All antenna ports in the L antenna port groups are used for one same serving cell, or all antenna ports in the L antenna port groups are used for one same carrier. The K is a positive integer, the L is a positive integer not less than the K, and the L is greater than 1. The L reference signal groups are transmitted by L antenna port groups respectively. Each of the L reference signal groups includes a positive integer number of reference signal(s), and reference signal(s) in the each reference signal group is (are one-to-one) corresponding to antenna port(s) in a corresponding transmitting antenna port group.

In one embodiment, the above UE is characterized in that: the first receiver further receives a second signaling. The second signaling is used for determining a specific threshold. Measurements for the L reference signal groups are used for determining L path losses respectively. The specific threshold is used for determining the K antenna port group(s) from the L antenna port groups. K path loss(es) among the L path losses is (are) used for determining the K reference power(s respectively).

In one embodiment, the above UE is characterized in that: the first receiver further receives L reference signal groups. The L reference signal groups are transmitted by L antenna port groups respectively. Each of the L reference signal groups includes a positive integer number of reference signal(s), and reference signal(s) in the each reference signal group is (are one-to-one) corresponding to antenna port(s) in a corresponding transmitting antenna port group.

In one embodiment, the above UE is characterized in that: each of the K difference value(s) is equal to a difference between a first power and a corresponding reference power; or a first difference value is equal to a difference between a second power and a corresponding reference power, and each of the K difference value(s) other than the first difference value is equal to a difference between a first power and a corresponding reference power; or the K difference value(s) is (are one-to-one) corresponding to K target power(s), and the difference value is equal to a difference between a corresponding target power and a corresponding reference power.

In one embodiment, the above UE is characterized in that: the first receiver further receives a second signaling. The second signaling is used for determining a specific threshold. Measurements for the L reference signal groups are used for determining L path losses respectively. The specific threshold is used for determining the K antenna port group(s) from the L antenna port groups. K path loss(es) among the L path losses is (are) used for determining the K reference power(s) respectively).

In one embodiment, the above UE is characterized in that: the first receiver further receives R downlink signalings. Herein, each of the R downlink signalings includes a first field and a second field. The R downlink signalings are used for one same serving cell, or, the R downlink signalings are used for one same carrier. The K reference power(s) is (are one-to-one) corresponding to K index(es). For any one given reference power among the K reference power(s), the R downlink signalings include a total number of R1 downlink signalings in which the first fields have values equal to the index corresponding to the given reference power, the given reference power is in linear correlation with a summation of R1 power offsets, and the R1 power offsets are indicated by the second fields in the R1 downlink signalings respectively. The R is a positive integer, and the R1 is a positive integer not greater than the R. Each of the K index(es) is an integer.

In one embodiment, the above UE is characterized in that: a third signaling is the latest downlink signaling among the R downlink signalings, the third signaling includes scheduling information of the first radio signal, and the scheduling information includes at least one of {occupied time domain resources, occupied frequency domain resources, an MCS, a HARQ process number, an RV, an NDI}.

In one embodiment, the above UE is characterized in that: the first radio signal is used for determining at least one of {the K, first indication information}, the first indication information being applied to the K difference values. The first indication information indicates whether a MAC entity employs power backoff, and the K is greater than 1.

The disclosure provides a base station for power adjustment, wherein the base station includes:

a second transmitter, to transmit L reference signal groups; and a second receiver, to receive a first radio signal in a first time window.

Herein, the first radio signal is used for determining K difference value(s), and the K difference value(s) is (are one-to-one) corresponding to K reference power(s). The reference power is a power estimated for transmission of an uplink channel. Measurement(s) for K antenna port group(s) are used for determining the K reference power(s respectively). The first radio signal is used for determining position(s) of the K antenna port group(s) in L antenna port groups. The antenna port group includes a positive integer number of antenna port(s). All antenna ports in the L antenna port groups are used for one same serving cell, or all antenna ports in the L antenna port groups are used for one same carrier. The K is a positive integer, the L is a positive integer not less than the K, and the L is greater than 1. The L reference signal groups are transmitted by L antenna port groups respectively. Each of the L reference signal groups includes a positive integer number of reference signal(s), and reference signal(s) in the each reference signal group is (are one-to-one) corresponding to antenna port(s) in a corresponding transmitting antenna port group.

In one embodiment, the above base station is characterized in that: the second transmitter further transmits a second signaling. The second signaling is used for determining a specific threshold. Measurements for the L reference signal groups are used for determining L path losses respectively. The specific threshold is used for determining the K antenna port group(s) from the L antenna port groups. K path loss(es) among the L path losses is (are) used for determining the K reference power(s respectively).

In one embodiment, the above base station is characterized in that: the second transmitter further transmits L reference signal groups. The L reference signal groups are transmitted by L antenna port groups respectively. Each of the L reference signal groups includes a positive integer number of reference signal(s), and reference signal(s) in the each reference signal group is (are one-to-one) corresponding to antenna port(s) in a corresponding transmitting antenna port group.

In one embodiment, the above base station is characterized in that: each of the K difference value(s) is equal to a difference between a first power and a corresponding reference power; or a first difference value is equal to a difference between a second power and a corresponding reference power, and each of the K difference value(s) other than the first difference value is equal to a difference between a first power and a corresponding reference power; or the K difference value(s) is (are one-to-one) corresponding to K target power(s), and the difference value is equal to a difference between a corresponding target power and a corresponding reference power.

In one embodiment, the above base station is characterized in that: the second transmitter further transmits a first signaling. The first signaling indicates a time duration of a first timer, and the expiration of the first timer is used for triggering reporting of the K difference value(s).

In one embodiment, the above base station is characterized in that: the second transmitter further transmits a second signaling. The second signaling is used for determining a specific threshold. Measurements for the L reference signal groups are used for determining L path losses respectively. The specific threshold is used for determining the K antenna port group(s) from the L antenna port groups. K path loss(es) among the L path losses is (are) used for determining the K reference power(s respectively).

In one embodiment, the above base station is characterized in that: the second transmitter further transmits R downlink signalings. Each of the R downlink signalings includes a first field and a second field. The R downlink signalings are used for one same serving cell, or, the R downlink signalings are used for one same carrier. The K reference power(s) is (are one-to-one) corresponding to K index(es). For any one given reference power among the K reference power(s), the R downlink signalings include a total number of R1 downlink signalings in which the first fields have values equal to the index corresponding to the given reference power, the given reference power is in linear correlation with a summation of R1 power offsets, and the R1 power offsets are indicated by the second fields in the R1 downlink signalings respectively. The R is a positive integer, and the R1 is a positive integer not greater than the R. Each of the K index(es) is an integer.

In one embodiment, the first field includes 2 bits.
In one embodiment, the first field includes 3 bits.
In one embodiment, the first field includes 4 bits.

In one embodiment, the above base station is characterized in that: a third signaling is the latest downlink signaling among the R downlink signalings, the third signaling includes scheduling information of the first radio signal, and the scheduling information includes at least one of {occupied time domain resources, occupied frequency domain resources, an MCS, a HARQ process number, an RV, an NDI}.

In one embodiment, the above base station is characterized in that: the first radio signal is used for determining at least one of {the K, first indication information}, the first indication information being applied to the K difference values. The first indication information indicates whether a MAC entity employs power backoff, and the K is greater than 1.

Compared with conventional schemes, the disclosure has the following benefits.

Multiple independent PH reporting processes and uplink power control processes are supported simultaneously for one serving cell.

Different PH reporting processes/uplink power control processes can correspond to different {receiving beamforming vectors, transmitting beamforming vectors}. Since different {receiving beamforming vectors, transmitting beamforming vectors} have big differences in channel long-time fading, each power control process can adjust the uplink power according to actual channel statistical characteristics, so that the uplink power control is more appropriate for the characteristics of channels of uplink transmission, and the efficiency and performance of the uplink power control are improved.

BRIEF DESCRIPTION OF THE DRAWINGS

Other features, purposes and advantages of the disclosure will become more apparent from the detailed description of non-restrictive embodiments taken in conjunction with the following drawings.

DESCRIPTION OF THE EMBODIMENTS

Embodiment 1

Figure 1:
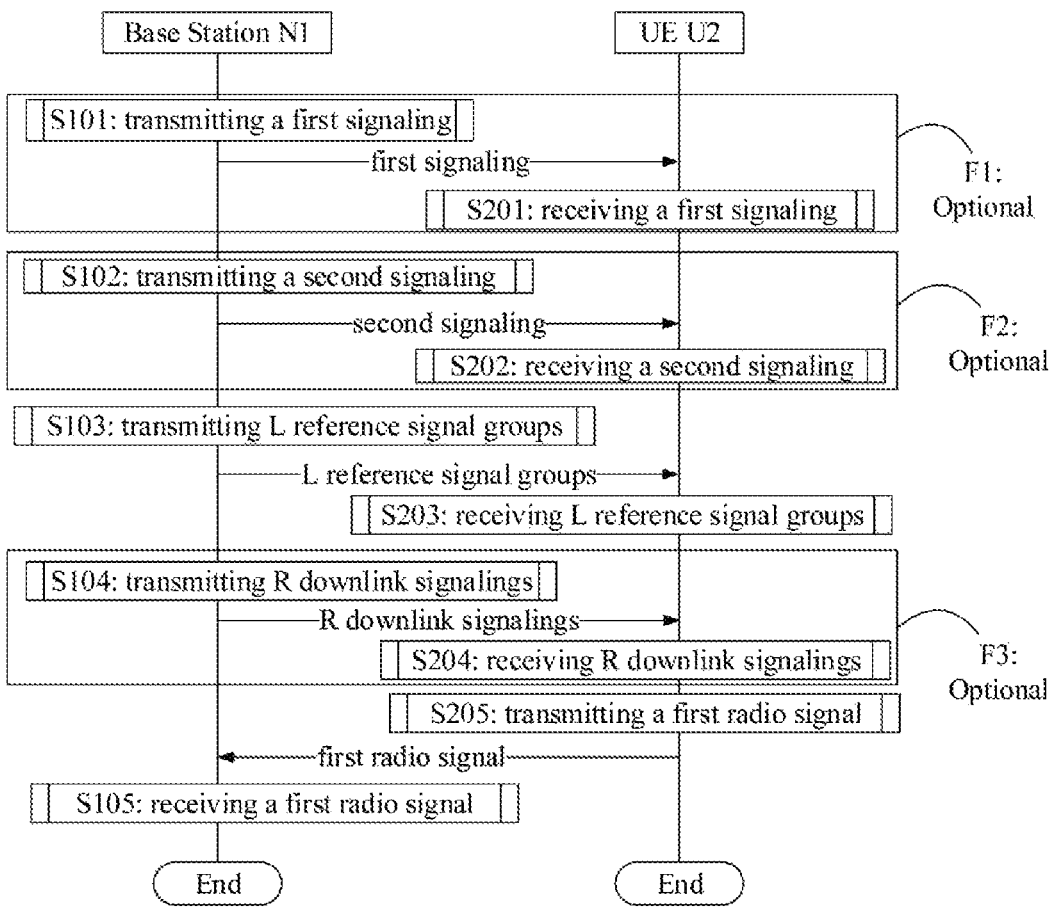
FIG. 1 is a flowchart of the transmission of a first radio signal according to one embodiment of the disclosure.

Embodiment 1 illustrates an example of a flowchart of the transmission of a first radio signal, as shown in FIG. 1. In FIG. 1, a base station N1 is a maintenance base station for a serving cell of a UE U2. In FIG. 1, steps in box F1, box F2 and box F3 are optional.

The N1 transmits a first signaling in S101, transmits a second signaling in S102, transmits L reference signal groups in S103, transmits R downlink signalings in S104, and receives a first radio signal in a first time window in S105.

The U2 receives a first signaling in S201, receives a second signaling in S202, receives L reference signal groups in S203, receives R downlink signalings in S204, and transmits a first radio signal in a first time window in S205.

In Embodiment 1, the first radio signal is used by the U2 to determine K difference values, and the K difference value(s) is (are one-to-one) corresponding to K reference power(s). The reference power is a power estimated for transmission of an uplink channel. Measurements for K antenna port group(s) are used by the U2 to determine the K reference powers respectively. The first radio signal is used by the N1 to determine positions of the K antenna port group(s) in L antenna port groups. The antenna port group includes a positive integer number of antenna port(s). All antenna ports in the L antenna port groups transmit radio signals on one same serving cell, or all antenna ports in the L antenna port groups transmit radio signals on one same carrier. The K is a positive integer, the L is a positive integer not less than the K, and the L is greater than 1. The L reference signal groups are transmitted by L antenna port groups respectively. Each of the L reference signal groups includes a positive integer number of reference signal(s), and reference signal(s) in the each reference signal group is (are one-to-one) corresponding to antenna port(s) in a corresponding transmitting antenna port group. The first signaling indicates a time duration of a first timer, and the expiration of the first timer is used for triggering reporting of the K difference value(s). The second signaling is used for determining a specific threshold. Measurements for the L reference signal groups are used for determining L path losses respectively. The specific threshold is used by the U2 to determine the K antenna port group(s) from the L antenna port groups. The K reference powers are in linear correlation with K path losses among the L path losses. Each of the R downlink signalings includes a first field and a second field. The R downlink signalings are used for one same serving cell, or, the R downlink signalings are used for one same carrier. The K reference power(s) is (are one-to-one) corresponding to K index(es). For any one given reference power among the K reference power(s), the R downlink signalings include a total number of R1 downlink signalings in which the first fields have values equal to the index corresponding to the given reference power, the given reference power is in linear correlation with a summation of R1 power offsets, and the R1 power offsets are indicated by the second fields in the R1 downlink signalings respectively. The R is a positive integer, and the R1 is a positive integer not greater than the R. Each of the K index(es) is an integer.

In one embodiment, a transmit power of the first radio signal is equal to a minimum value between a first power and a first reference power, and the first reference power is one of the K reference powers.

In one embodiment, a first difference value is equal to a difference between a second power and a corresponding reference power, and each of the K difference value(s) other than the first difference value is equal to a difference between a first power and a corresponding reference power. That is:

$$D_k = P^2 - P_k (k=0)$$

$$D_k = P^1 - P_k (k=1,2,\ldots,K-1)$$

Herein, k, $D_k$, $P^1$, $P^2$, $P_k$ represent respectively an index of a given difference value in the K difference values, the given difference value, the first power, the second power, and the reference power corresponding to the given reference value. The index of the first difference value in the K difference values is 0.

In one subembodiment, the $P^1$, $P^2$ are the $\tilde{P}_{CMAX,c}(i)$ and the $P_{CMAX,c}(i)$ in the disclosure respectively.

In one subembodiment, $P_k=\{P_{O\_PUSCH,c}(1)+\alpha_c(1) \cdot PL_c^k + f_c^k(i)\}$, where (k=1, 2, . . . , K−1), c, $P_{O\_PUSCH,c}(1)$, $\alpha_c(1)$, $PL_c^k$, $f_c^k(i)$ represent respectively an index of a serving cell corresponding to the first radio signal (that is, used for carrying the first radio signal), a parameter for dynamic scheduled grant, a path loss compensation factor for a serving cell identified with c, and a path loss obtained by a measurement for a corresponding antenna port group (corresponding to a difference value indexed with k), and a summation of the R1 power offsets (corresponding to a difference value indexed with k). Detailed explanations for corresponding variables can refer to Chapter 5.1.1.1 in TS36.213—Remove superscript k.

In one subembodiment:
$P_0=\{10 \ \log_{10}(M_{PUSCH,c}(i))+P_{O\_PUSCH,c}(j)+\alpha_c(j) \cdot PL_c + \Delta_{TF,c}(i)+f_c^k(i)\}$, where $P_0$ is the reference power corresponding to the first difference value, c, $M_{PUSCH,c}(i)$, $P_{O\_PUSCH,c}(1)$, $\alpha_c(j)$, $PL_c^k$, $f_c^k(i)$ represent respectively an index of a serving cell corresponding to the first radio signal, the number of PRBs (Physical Resource Blocks) occupied by the first radio signal, a scheduling type related parameter, a scheduling type related path loss compensation factor for a serving cell identified with c, a path loss obtained by a measurement for a corresponding antenna port group (corresponding to a difference value indexed with c), and a summation of the R1 power offsets (corresponding to a difference value indexed with c). Detailed introductions can refer to Chapter 5.1.1.1 in TS36.213—Remove superscript k.

In one embodiment, the first radio signal is transmitted on a physical layer data channel.

In one embodiment, each of the K difference value(s) is equal to a difference between a first power and a corresponding reference power, that is, $D_k=P^1-P_k$(k=0, . . . , K−1), where k, $D_k$, $P^1$, $P_k$ represent respectively an index of a given difference value in the K difference values, the given difference value, the first power, and the reference power corresponding to the given difference value.

In one subembodiment, $P_k=\{P_{O\_PUSCH,c}(1)+\alpha_c(1) \cdot PL_c^k + f_c^k(i)\}$, where (k=0, 1, 2, . . . , K−1), c, $P_{O\_PUSCH,c}(1)$, $\alpha_c(1)$, $PL_c^k$, $f_c^k(i)$ represent respectively an index of a serving cell corresponding to the L antenna port group, a parameter for dynamic scheduled grant, a path loss factor for a serving cell identified with c, a path loss obtained by a measurement for a corresponding antenna port group (corresponding to a difference value indexed with k), and a summation of the R1 offsets (corresponding to a difference value indexed with k). Detailed explanations for corresponding variables can refer to Chapter 5.1.1.1 in TS36.213—Remove superscript k.

In one embodiment, the first power, the second power, the reference power and the target power are all in unit of dBm.

In one embodiment, the first field includes two bits.

In one embodiment, the first field includes three bits.

In one embodiment, the first field includes four bits.

In one embodiment, the difference value is indicated by six bits.

In one embodiment, the second field is TPC.

Embodiment 2

Figure 2:
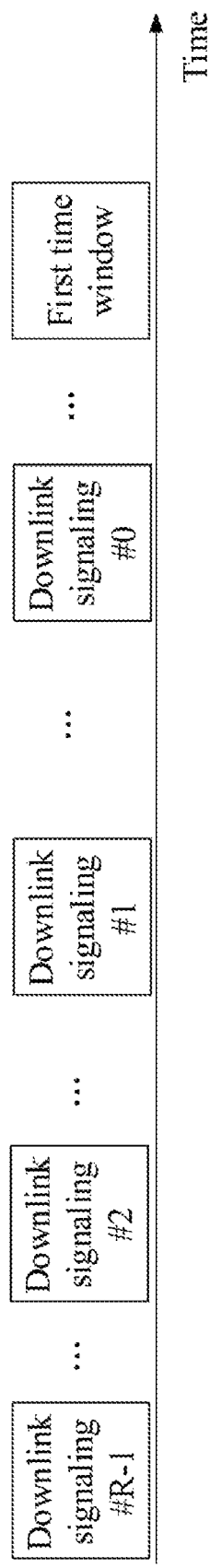
FIG. 2 is a sequence diagram of R downlink signalings according to one embodiment of the disclosure.

Embodiment 2 illustrates an example of a sequence diagram of R downlink signalings, as shown in FIG. 2. In FIG. 2, the R downlink signalings are indexed from {0, 1, 2, . . . , R−1} respectively.

In Embodiment 2, any two of the R downlink signalings occupy time domain resources which are orthogonal (that is, not overlapping). The first time window in the disclosure is behind the time domain resources occupied by the downlink signaling #0.

In one embodiment, the downlink signaling is Downlink Control Information (DCI) for uplink grant.

In one embodiment, the downlink signaling #0 is the third signaling in the disclosure.

Embodiment 3

Figure 3:
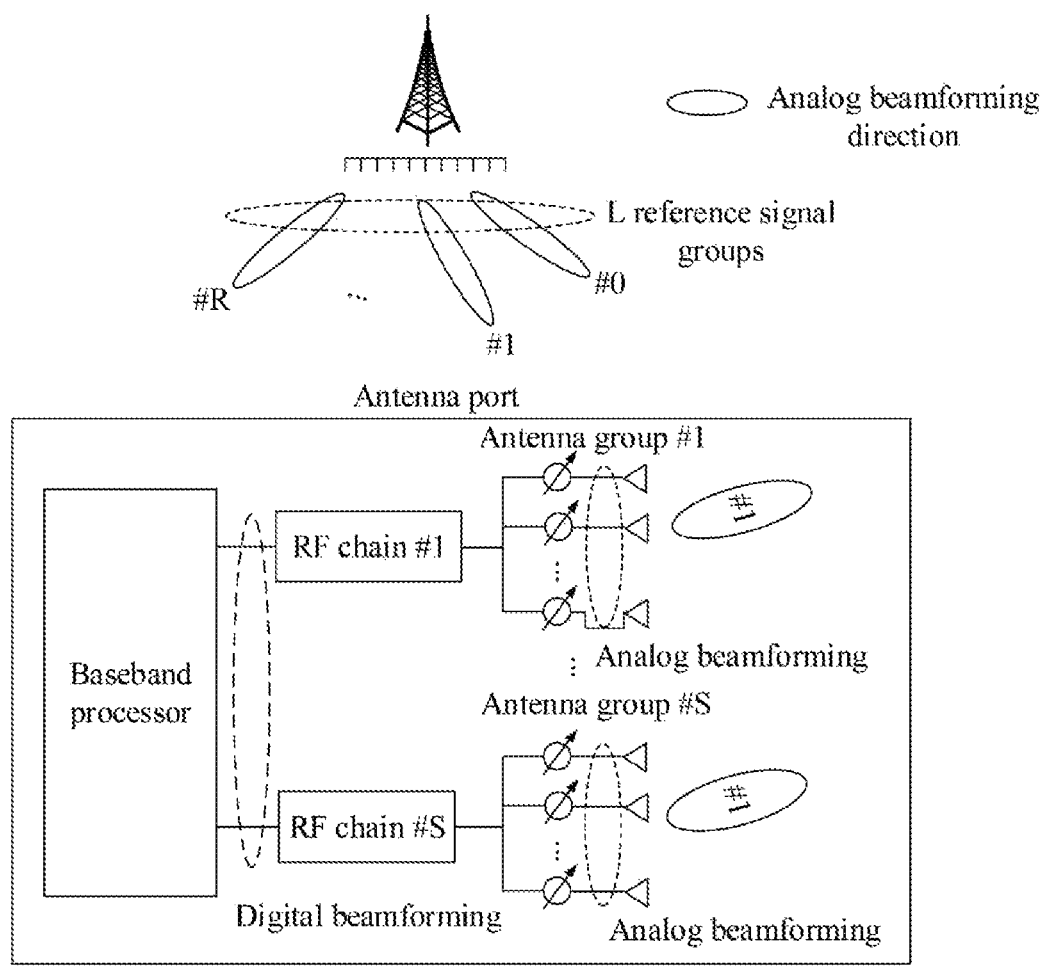
FIG. 3 is a diagram illustrating the analog beamforming of L reference signal groups according to one embodiment of the disclosure.

Embodiment 3 illustrates an example of a diagram of the analog beamforming of L reference signal groups, as shown in FIG. 3.

In Embodiment 3, the L reference signal groups are one-to-one corresponding to L antenna port groups. The number of reference signals in the reference signal group are equal to the number of antenna ports in the corresponding antenna port group.

In embodiment 3, antennas configured for a base station is divided into multiple antenna groups, each of the antenna groups includes multiple antennas. The antenna port is formed by multiple antennas in one or more antenna groups through antenna virtualization superposition, and mapping coefficients from the multiple antennas in one or more antenna groups to the antenna port constitute a beamforming vector. One antenna group is connected to a baseband processor through one Radio Frequency (RF) chain. One beamforming vector is formed by a Kronecker product of an analog beamforming vector and a digital beamforming vector. Mapping coefficients from the multiple antennas in one same antenna group to the antenna port constitute an analog beamforming vector of the antenna group, and different antenna groups included in one antenna port correspond to the same analog beamforming vector. Mapping coefficients from the different antenna groups included in one antenna port to the antenna port constitute a digital beamforming vector of the antenna port.

In one Subembodiment 1, the reference signal group includes one reference signal only, and the reference signal in the reference signal group is transmitted by an antenna port in a corresponding transmitting antenna port group.

In one Subembodiment 2, the reference signal group includes multiple reference signals, and the multiple reference signals in the reference signal group are transmitted by multiple antenna ports in a corresponding transmitting antenna port group. Different antenna ports in one antenna port group correspond to the same analog beamforming vector.

In one Subembodiment 3, different antenna ports in one antenna port group correspond to different digital beamforming vectors.

In one Subembodiment 4, the L is configurable.

In one Subembodiment 5, the L antenna port groups are a subset of M antenna port groups, a UE transmits auxiliary information according to measurements for the M antenna port groups, and the base station determines and configures the L antenna port groups for the UE according to the auxiliary information.

Embodiment 4

Figure 4:
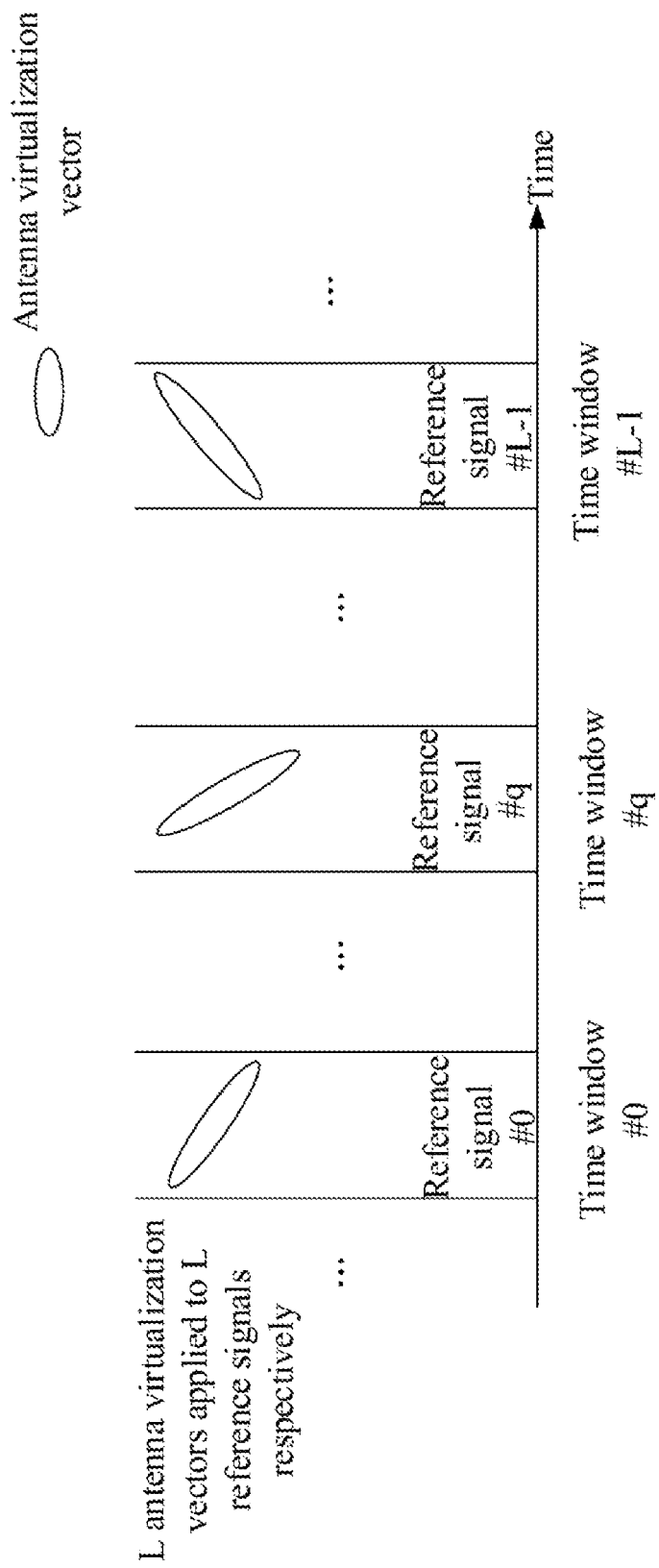
FIG. 4 is a sequence diagram of L reference signals according to one embodiment of the disclosure.

Embodiment 4 illustrates an example of a sequence diagram of L reference signals, as shown in FIG. 4.

In Embodiment 4, the reference signal group in the disclosure includes one reference signal only, and any two of the L reference signal groups occupy time domain resources which are orthogonal. Antenna virtualization vectors corresponding to any two of the L reference signal groups cannot be considered to be the same.

In one Subembodiment 1, FIG. 4 describes one time of transmission of the L reference signals, and the reference signals are transmitted periodically.

In one Subembodiment 2, in one time window, the reference signal employs a CSI-RS pattern.

In one Subembodiment 3, the time window in FIG. 4 includes Q1 OFDM symbols, and the Q1 is one of {2, 4, 7, 14}.

Embodiment 5

Figure 5:
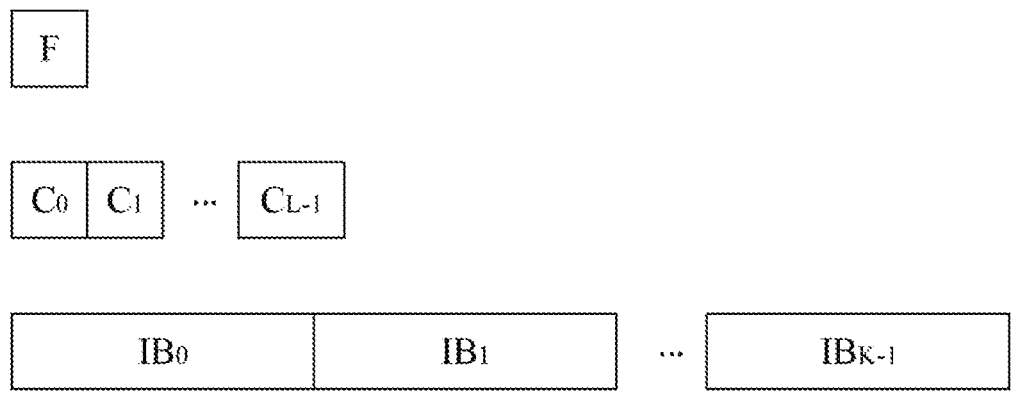
FIG. 5 is a diagram illustrating an indication of K difference values in a first radio signal according to one embodiment of the disclosure.

Embodiment 5 illustrates an example of a diagram of an indication of K difference values in a first radio signal, as shown in FIG. 5. In FIG. 5, the first radio signal includes three parts of information, wherein the first part is a flag bit F, the second part is a bitmap composed of L bits ($C_0$-$C_{L-1}$), and the third part is K information blocks ($IB_0$-$IB_{K-1}$).

In Embodiment 5, the first part is applicable to K difference values indicated by the third part, and the flag bit F indicates whether an MAC entity employs power backoff. The L bits in the second part indicate whether the L antenna port groups in the disclosure are selected respectively, K bits among the L bits are in a first state, and the other bits are in a second state. K antenna port group(s) corresponding to the K bits are one-to-one corresponding to the K information blocks. The K information blocks in the third part indicate the K difference values in the disclosure respectively.

In one Subembodiment 1, the first state is 1, and the second state is 0.

In one Subembodiment 2, the first state is 0, and the second state is 1.

In one Subembodiment 3, the information block consists of six bits.

In one Subembodiment 4, the first radio signal further includes upper-layer data.

Embodiment 6

Figure 6:
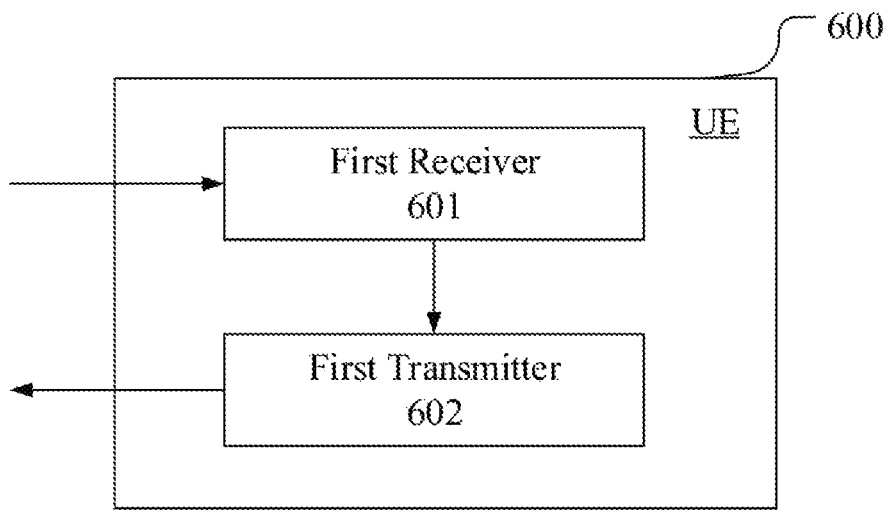
FIG. 6 is a structure block diagram of a processing device in a UE according to one embodiment of the disclosure.

Embodiment 6 illustrates an example of a structure block diagram of a processing device in a UE, as shown in FIG. 6. In FIG. 6, the processing device 600 in the UE is mainly composed of a first receiver 601 and a first transmitter 602.

In Embodiment 6, the first receiver 601 receives L reference signal groups; and the first transmitter 602 transmits a first radio signal in a first time window.

In Embodiment 6, the first radio signal is used for determining K difference value(s), and the K difference value(s) is (are one-to-one) corresponding to K reference power(s). The reference power is a power estimated for transmission of an uplink channel. Path losses measured for K antenna port group(s) are used for determining the K reference powers respectively. The first radio signal is used for determining position(s) of the K antenna port group(s) in L antenna port groups. The antenna port group includes a positive integer number of antenna port(s). All antenna ports in the L antenna port groups are used for one same serving cell. The K is a positive integer, the L is a positive integer not less than the K, and the L is greater than 1. The L reference signal groups are transmitted by L antenna port groups respectively. Each of the L reference signal groups includes a positive integer number of reference signal(s), and reference signal(s) in the each reference signal group is (are one-to-one) corresponding to antenna port(s) in a corresponding transmitting antenna port group.

In one Subembodiment 1, the first receiver 601 further receives a second signaling. The second signaling is used for determining a specific threshold. Measurements for the L reference signal groups are used for determining L path losses respectively. K path loss(es) among the L path losses is (are) used for determining the K reference power(s respectively). The K path losses all have changes greater than the specific threshold, and path losses among the L path losses other than the K path losses have changes not greater than the specific threshold.

In one Subembodiment 2, the L is configurable.

In one Subembodiment 3, the difference value is PH.

Embodiment 7

Figure 7:
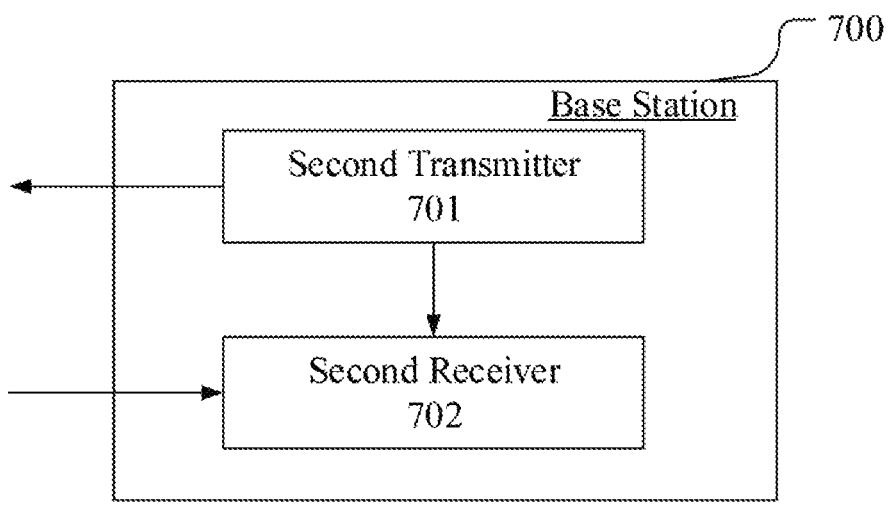
FIG. 7 is a structure block diagram of a processing device in a base station according to one embodiment of the disclosure.

Embodiment 7 illustrates an example of a structure block diagram of a processing device in a base station, as shown in FIG. 7. In FIG. 7, the processing device 700 in the base station is mainly composed of a second transmitter 701 and a second receiver 702.

In Embodiment 7, the second transmitter 701 transmits L reference signal groups; and the second receiver 702 receives a first radio signal in a first time window.

In Embodiment 7, the first radio signal is used for determining K difference value(s), and the K difference value(s) is (are one-to-one) corresponding to K reference power(s). The reference power is a power estimated for transmission of an uplink channel. Path losses measured for K antenna port group(s) are used for determining the K reference powers respectively. The first radio signal is used for determining position(s) of the K antenna port group(s) in L antenna port groups. The antenna port group includes a positive integer number of antenna port(s). All antenna ports in the L antenna port groups are used for one same carrier. The K is a positive integer, the L is a positive integer not less than the K, and the L is greater than 1. The L reference signal groups are transmitted by L antenna port groups respectively. Each of the L reference signal groups includes a positive integer number of reference signal(s), and reference signal(s) in the each reference signal group is (are one-to-one) corresponding to antenna port(s) in a corresponding transmitting antenna port group.

In one Subembodiment 1, the second transmitter 701 further transmits L reference signal groups. The L reference signal groups are transmitted by L antenna port groups respectively. Each of the L reference signal groups includes a positive integer number of reference signal(s), and reference signal(s) in the each reference signal group is (are one-to-one) corresponding to antenna port(s) in a corresponding transmitting antenna port group.

Embodiment 8

Figure 8:
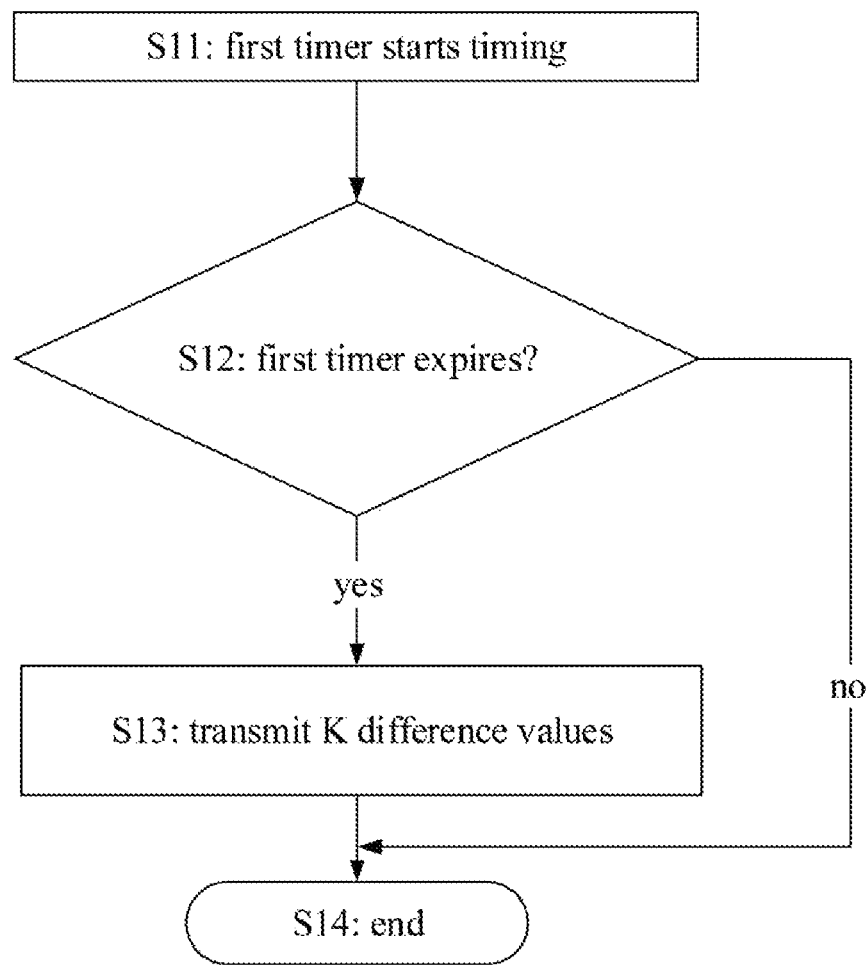
FIG. 8 is a flowchart of a judgment of whether to transmit K difference values according to one embodiment of the disclosure.

Embodiment 8 illustrates an example of a flowchart of a judgment of whether to transmit K difference values, as shown in FIG. 8. The flowchart in FIG. 8 is performed on the UE side.

In S11, a first timer starts timing. In S12, it is judged whether the first timer expires. If the first timer expires, K difference values are transmitted in S13. If the first timer does not expire, go to S14 to end it.

In Subembodiment 1, the first timer is a periodicPHR-Timer, and the K is equal to the L in the disclosure.

In Subembodiment 2, the first timer is a prohibitPHR-Timer, and K path losses corresponding to the K difference values include the path losses among the L path losses in the disclosure which have changes greater than the specific threshold in the disclosure.

Embodiment 9

Figure 9:
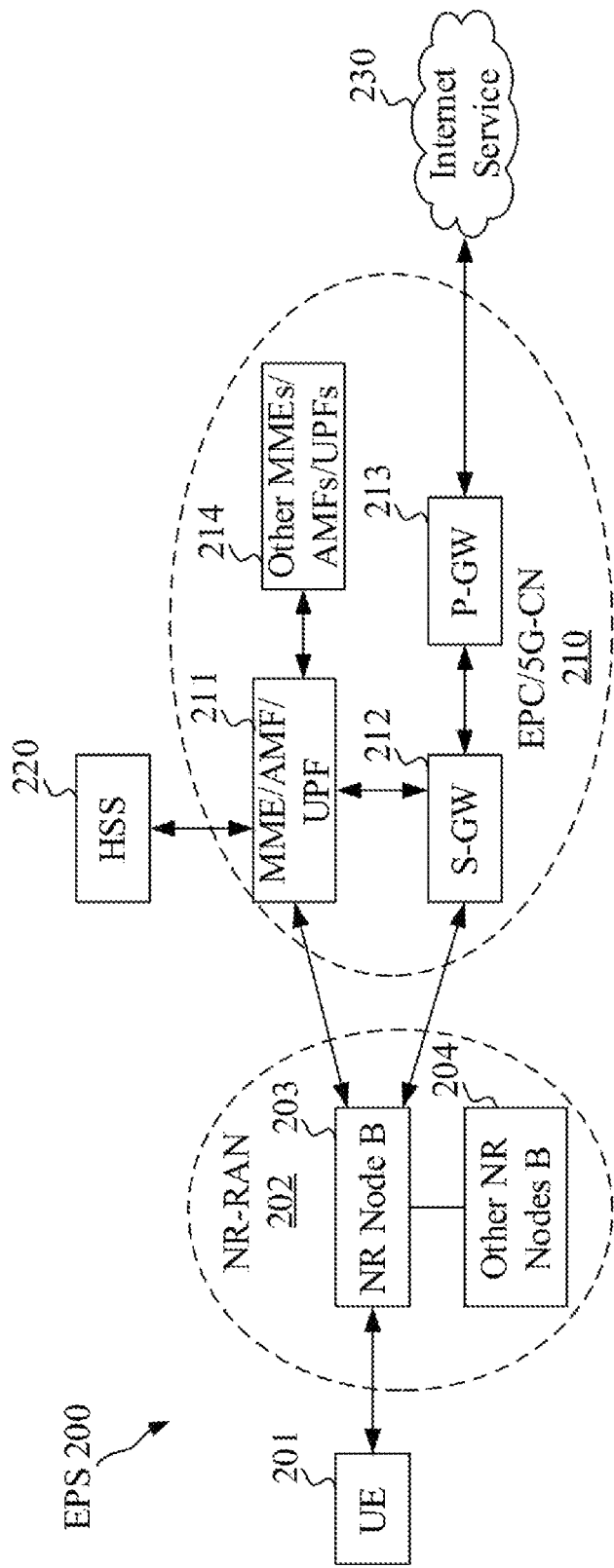
FIG. 9 is a diagram illustrating a network architecture according to one embodiment of the disclosure.

Embodiment 9 illustrates an example of a diagram of a network architecture, as shown in FIG. 9.

Embodiment 9 illustrates an example of a diagram of a network architecture according to the disclosure, as shown in FIG. 9. FIG. 9 is a diagram illustrating a network architecture 200 of New Radio (NR), or LTE and Long-Term Evolution Advanced (LTE-A) systems. The network architecture 200 may be called an Evolved Packet System (EPS) 200 or some other appropriate terms. The EPS 200 may include one or more UEs 201, a Next Generation-Radio Access Network (NG-RAN) 202, an Evolved Packet Core/ 5G-Core Network (EPC/5G-CN) 210, a Home Subscriber Server (HSS) 220 and an Internet service 230. The EPS may be interconnected with other access networks. For simple description, the entities/interfaces are not shown. As shown in FIG. 9, the EPS provides packet switching services. Those skilled in the art are easy to understand that various concepts presented throughout the disclosure can be extended to networks providing circuit switching services or other cellular networks. The NG-RAN includes an NR node B (gNB) 203 and other gNBs 204. The gNB 203 provides UE 201 oriented user plane and control plane protocol terminations. The gNB 203 may be connected to other gNBs 204 via an Xn interface (for example, backhaul). The gNB 203 may also be called a base station, a base transceiver station, a radio base station, a radio transceiver, a transceiver function, a Basic Service Set (BSS), an Extended Service Set (ESS), a TRP or some other appropriate terms. The gNB 203 provides an access point of the EPC/5G-CN 210 for the UE 201. Examples of UE 201 include cellular phones, smart phones, Session Initiation Protocol (SIP) phones, laptop computers, Personal Digital Assistants (PDAs), Satellite Radios, non-territorial network base station communications, satellite mobile communications, Global Positioning Systems (GPSs), multimedia devices, video devices, digital audio players (for example, MP3 players), cameras, games consoles, unmanned aerial vehicles, air vehicles, narrow-band physical network equipment, machine-type communication equipment, land vehicles, automobiles, wearable equipment, or any other devices having similar functions. Those skilled in the art may also call the UE 201 a mobile station, a subscriber station, a mobile unit, a subscriber unit, a wireless unit, a remote unit, a mobile device, a wireless device, a radio communication device, a remote device, a mobile subscriber station, an access terminal, a mobile terminal, a wireless terminal, a remote terminal, a handset, a user proxy, a mobile client, a client or some other appropriate terms. The gNB 203 is connected to the EPC/5G-CN 210 via an S1/NG interface. The EPC/5G-CN 210 includes a Mobility Management Entity/Authentication Management Field/User Plane Function (MME/AMF/UPF) 211, other MMEs/AMFs/UPFs 214, a Service Gateway (S-GW) 212 and a Packet Data Network Gateway (P-GW) 213. The MME/AMF/UPF 211 is a control node for processing signalings between the UE 201 and the EPC/5G-CN 210. Generally, the MME/AMF/UPF 211 provides bearer and connection management. All user Internet Protocol (IP) packets are transmitted through the S-GW 212. The S-GW 212 is connected to the P-GW 213. The P-GW 213 provides UE IP address allocation and other functions. The P-GW 213 is connected to the Internet service 230. The Internet service 230 includes IP services corresponding to operators, specifically including internet, intranet, IP Multimedia Subsystems (IP IMSs) and PS Streaming Services (PSSs).

In one subembodiment, the UE 201 corresponds to the UE in the disclosure.

In one subembodiment, the gNB 203 corresponds to the base station in the disclosure.

In one subembodiment, the UE 201 supports massive MIMO.

In one subembodiment, the gNB 203 supports massive MIMO.

Embodiment 10

Figure 10:
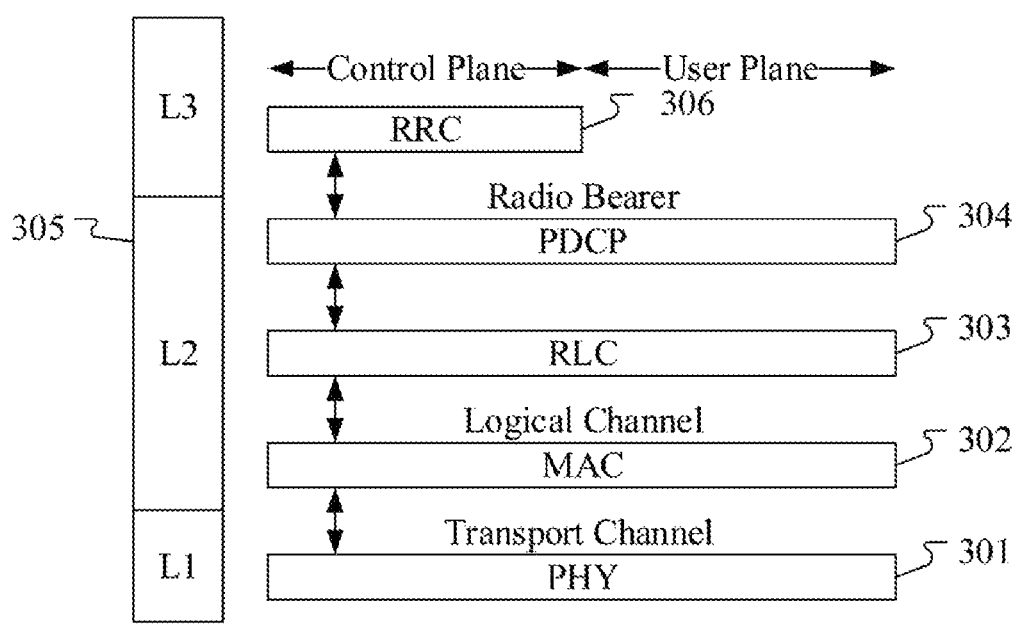
FIG. 10 is a diagram illustrating a radio protocol architecture of a user plane and a control plane according to one embodiment of the disclosure.

Embodiment 10 is a diagram illustrating an embodiment of a radio protocol architecture of a user plane and a control plane according to the disclosure, as shown in FIG. 10.

FIG. 10 is a diagram illustrating an embodiment of a radio protocol architecture of a user plane and a control plane. In FIG. 10, the radio protocol architecture of a UE and a base station (gNB or eNB) is represented by three layers, which are a Layer 1, a Layer 2 and a Layer 3 respectively. The Layer 1 (L1 layer) 301 is the lowest layer and implements various PHY (physical layer) signal processing functions. The L1 layer will be referred to herein as the PHY 301. The Layer 2 (L2 layer) 305 is above the PHY 301, and is responsible for the link between the UE and the gNB over the PHY 301. In the user plane, the L2 layer 305 includes a Medium Access Control (MAC) sublayer 302, a Radio Link Control (RLC) sublayer 303, and a Packet Data Convergence Protocol (PDCP) sublayer 304, which are terminated at the gNB on the network side. Although not shown in FIG. 10, the UE may include several higher layers above the L2 layer 305, including a network layer (i.e. IP layer) terminated at the P-GW on the network side and an application layer terminated at the other end (i.e. a peer UE, a server, etc.) of the connection. The PDCP sublayer 304 provides multiplexing between different radio bearers and logical channels. The PDCP sublayer 304 also provides header compression for higher-layer packets so as to reduce radio transmission overheads. The PDCP sublayer 304 provides security by encrypting packets and provides support for UE handover between gNBs. The RLC sublayer 303 provides segmentation and reassembling of higher-layer packets, retransmission of lost packets, and reordering of lost packets to as to compensate for out-of-order reception due to HARQ. The MAC sublayer 302 provides multiplexing between logical channels and transport channels. The MAC sublayer 302 is also responsible for allocating various radio resources (i.e., resource blocks) in one cell among UEs. The MAC sublayer 302 is also in charge of HARQ operations. In the control plane, the radio protocol architecture of the UE and the gNB is almost the same as the radio protocol architecture in the user plane on the PHY 301 and the L2 layer 305, with the exception that there is no header compression function for the control plane. The control plane also includes a Radio Resource Control (RRC) sublayer 306 in the layer 3 (L3). The RRC sublayer 306 is responsible for acquiring radio resources (i.e. radio bearers) and configuring lower layers using an RRC signaling between the gNB and the UE.

In one subembodiment, the radio protocol architecture shown in FIG. 10 is applicable to the UE in the disclosure.

In one subembodiment, the radio protocol architecture shown in FIG. 10 is applicable to the base station in the disclosure.

In one subembodiment, the first radio signal in the disclosure is generated by the PHY 301.

In one subembodiment, the first radio signal in the disclosure is generated by the RRC sublayer 306.

In one subembodiment, the first signaling in the disclosure is generated by the RRC sublayer 306.

In one subembodiment, the second signaling in the disclosure is generated by the RRC sublayer 306.

In one subembodiment, the R downlink signalings in the disclosure are generated by the PHY 301.

Embodiment 11

Figure 11:
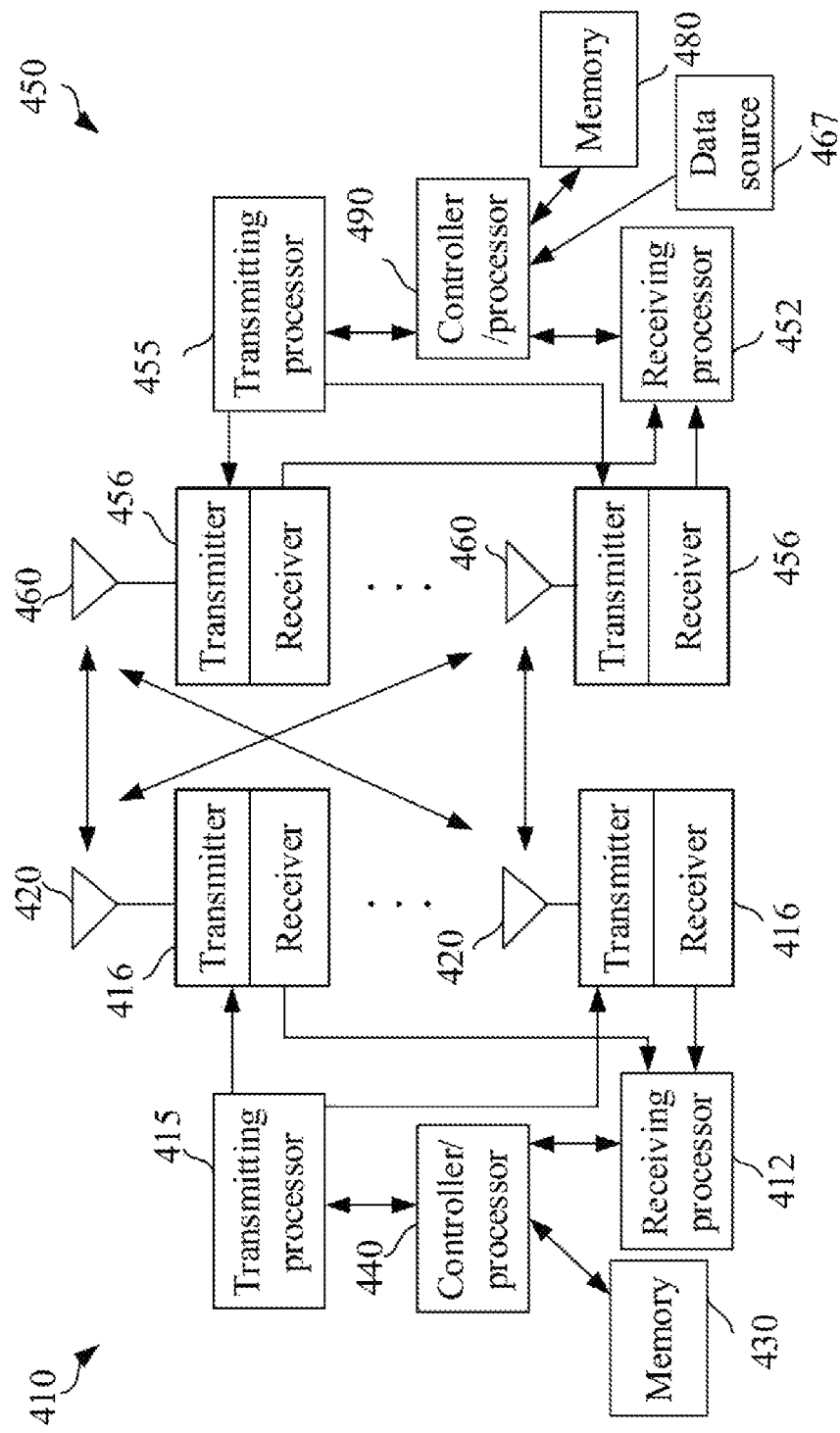
FIG. 11 is a diagram illustrating a base station and a UE according to one embodiment of the disclosure.

Embodiment 11 illustrates a diagram of a base station and a UE according to the disclosure, as shown in FIG. 11. FIG. 11 is a block diagram of a gNB 410 in communication with a UE 450 in an access network.

The UE 450 includes a controller/processor 490, a memory 480, a receiving processor 452, a transmitter/receiver 456, a transmitting processor 455, and a data source 467. The transmitter/receiver 456 includes an antenna 460. The data source 467 provides higher-layer packets to the controller/processor 490. The controller/processor 490 provides header compression/decompression, encryption/decryption, packet segmentation and reordering, multiplexing/de-multiplexing between a logical channel and a transport channel, to implement L2 protocols used for the user plane and the control plane. The higher-layer packet may include data or control information, for example, Downlink Shared Channel (DL-SCH) or Uplink Shared Channel (UL-SCH). The transmitting processor 455 performs various signal transmitting processing functions of L1 layer (that is, PHY), including encoding, interleaving, scrambling, modulation, power control/allocation, precoding, generation of physical layer control signalings, etc. The receiving processor 452 performs various signal receiving processing functions of L1 layer (that is, PHY), including decoding, de-interleaving, descrambling, demodulation, de-precoding, extraction of physical layer control signalings, etc. The transmitter 456 is configured to convert a baseband signal provided by the transmitting processor 455 into a radio-frequency signal and transmit the radio-frequency signal via the antenna 460. The receiver 456 is configured to convert a radio-frequency signal received via the antenna 460 into a baseband signal and provide the baseband signal to the receiving processor 452.

The base station 410 may include a controller/processor 440, a memory 430, a receiving processor 412, a transmitter/receiver 416 and a transmitting processor 415. The transmitter/receiver 416 includes an antenna 420. Higher-layer packets are provided to the controller/processor 440. The controller/processor 440 provides header compression/decompression, encryption/decryption, packet segmentation and reordering, multiplexing/de-multiplexing between a logical channel and a transport channel, to implement L2 protocols used for the user plane and the control plane. The higher-layer packet may include data or control information, for example, DL-SCH or UL-SCH. The transmitting processor 415 performs various signal transmitting processing functions of L1 layer (that is, PHY), including encoding, interleaving, scrambling, modulation, power control/allocation, precoding, generation of physical layer control signalings (including Physical Broadcasting Channel (PBCH), Physical Downlink Control Channel (PDCCH), Physical Downlink Shared Channel (PDSCH), and reference signal), etc. The receiving processor 412 performs various signal receiving processing functions of L1 layer (that is, PHY), including decoding, de-interleaving, descrambling, demodulation, de-precoding, extraction of physical layer control signalings, etc. The transmitter 416 is configured to convert a baseband signal provided by the transmitting processor 415 into a radio-frequency signal and transmit the radio-frequency signal via the antenna 420. The receiver 416 is configured to convert a radio-frequency signal received via the antenna 420 into a baseband signal and provide the baseband signal to the receiving processor 412.

In Downlink (DL) transmission, a higher-layer packet DL-SCH, including the first signaling and the second signaling in the disclosure, is provided to the controller/processor 440. The controller/processor 440 performs functions of L2 layer. In downlink transmission, the controller/processor 440 provides header compression, encryption, packet segmentation and reordering, multiplexing between a logical channel and a transport channel, and radio resource allocation for the UE 450 based on various priority metrics. The controller/processor 440 is also in charge of HARQ operation, retransmission of lost packets, and signalings to the UE 450. The transmitting processor 415 performs various signal processing functions of L1 layer (that is, PHY), including generation of the L reference signals in the disclosure. The signal processing function includes coding and interleaving, so as to facilitate FEC (Forward Error Correction) at the UE 450 side and demodulation of baseband signals corresponding to different modulation schemes (i.e., BPSK, QPSK, etc.). The modulated symbols are split into parallel streams. Each of the parallel streams is mapped to corresponding subcarriers of multi-carriers and/or multi-carrier symbols. Then the transmitting processor 415 maps the parallel streams to the antenna 420 via the transmitter 416 so as to transmit the parallel streams in the form of Radio Frequency (RF) signals. The first signaling, the second signaling and the L reference signal groups in the disclosure are mapped to the antenna 420 by the transmitting processor 415 via the transmitter 416 so as to be transmitted in the form of RF signals. At the receiving side, every receiver 456 receives a radio frequency signal via the corresponding antenna 460. Every receiver 456 recovers the baseband information modulated to the RF carrier and provides the baseband information to the receiving processor 452. The receiving processor 452 performs various signal receiving processing functions of L1 layer. The signal receiving processing functions include receiving the L reference signal groups, the physical layer signal of the first signaling and the physical layer signal of the second signaling in the disclosure, conducting demodulation corresponding to different modulation schemes (i.e., BPSK, QPSK, etc.) through multi-carrier symbols in multi-carrier symbol streams, then decoding and de-interleaving to recover the data or control signal transmitted by the gNB 410 on the physical channel, and then providing the data and control signal to the controller/processor 490. The controller/processor 490 performs functions of L2 layer. The controller/processor may be connected to the memory 480 that stores program codes and data. The memory 480 may be called a computer readable medium.

In Uplink (UL) transmission, a higher-layer packet DL-SCH includes the first radio signal in the disclosure, and the data source 467 provides the first radio signal in the disclosure to the controller/processor 490. The data source 467 illustrates all the protocol layers above the L2 layer. The controller/processor 490 provides header compression, encryption, packet segmentation and reordering, and multiplexing between a logical channel and a transport channel through the radio resource allocation based on the gNB 410, to implement the L2 layer protocols used for the user plane and the control plane. The controller/processor 490 is also in charge of HARQ operation, retransmission of lost packets, and signalings to the gNB 410. The transmitting processor 415 performs various signal transmitting processing functions of L1 layer (that is, PHY). The signal transmitting processing function includes coding and interleaving, so as to facilitate FEC (Forward Error Correction) at the UE 450 side and demodulation of baseband signals corresponding to different modulation schemes (i.e., BPSK, QPSK, etc.). The modulated symbols are split into parallel streams. Each of the parallel streams is mapped to corresponding subcarriers of multi-carriers and/or multi-carrier symbols. Then the transmitting processor 455 maps the parallel streams to the antenna 460 via the transmitter 456 so as to transmit the parallel streams in the form of RF signals. The first radio signal in the disclosure is generated by the transmitting processor 455 and is mapped, via the transmitter 456, to the antenna 460 so as to be transmitted. The receiver 416 receives a radio frequency signal via the corresponding antenna 420. Every receiver 416 recovers the baseband information modulated to the RF carrier and provides the baseband information to the receiving processor 412. The receiving processor 412 performs various signal receiving processing functions of L1 layer. The signal receiving processing functions include acquiring multicarrier symbol streams, conducting demodulation corresponding to different modulation schemes (i.e., BPSK, QPSK, etc.) on multi-carrier symbols in the multicarrier symbol streams, then decoding and de-interleaving to recover the data or control signal originally transmitted by the UE 450 on the physical channel, and then providing the data and/or control signal to the controller/processor 440. The controller/processor 440 performs functions of L2 layer. The controller/processor may be connected to the memory 430 that stores program codes and data. The memory 430 may be called a computer readable medium.

In one embodiment, the UE 450 device includes at least one processor and at least one memory. The at least one memory includes computer program codes. The at least one memory and the computer program codes are configured to be used in collaboration with the at least one processor. The UE 450 device at least receives L reference signal groups and transmits a first radio signal in a first time window. Herein, the first radio signal is used for determining K difference value(s), and the K difference value(s) is (are one-to-one) corresponding to K reference power(s). The reference power is a power estimated for transmission of an uplink channel. Measurement(s) for K antenna port group(s) are used for determining the K reference power(s respectively). The first radio signal is used for determining position(s) of the K antenna port group(s) in L antenna port groups. The antenna port group includes a positive integer number of antenna port(s). All antenna ports in the L antenna port groups are used for one same serving cell, or all antenna ports in the L antenna port groups are used for one same carrier. The K is a positive integer, the L is a positive integer not less than the K, and the L is greater than 1. The L reference signal groups are transmitted by L antenna port groups respectively. Each of the L reference signal groups includes a positive integer number of reference signal(s), and reference signal(s) in the each reference signal group is (are one-to-one) corresponding to antenna port(s) in a corresponding transmitting antenna port group.

In one embodiment, the UE 450 includes a memory that stores a computer readable instruction program. The computer readable instruction program generates an action when executed by at least one processor. The action includes receiving L reference signal groups and transmitting a first radio signal in a first time window. Herein, the first radio signal is used for determining K difference value(s), and the K difference value(s) is (are one-to-one) corresponding to K reference power(s). The reference power is a power estimated for transmission of an uplink channel. Measurement(s) for K antenna port group(s) are used for determining the K reference power(s respectively). The first radio signal is used for determining position(s) of the K antenna port group(s) in L antenna port groups. The antenna port group includes a positive integer number of antenna port(s). All antenna ports in the L antenna port groups are used for one same serving cell, or all antenna ports in the L antenna port groups are used for one same carrier. The K is a positive integer, the L is a positive integer not less than the K, and the L is greater than 1. The L reference signal groups are transmitted by L antenna port groups respectively. Each of the L reference signal groups includes a positive integer number of reference signal(s), and reference signal(s) in the each reference signal group is (are one-to-one) corresponding to antenna port(s) in a corresponding transmitting antenna port group.

In one embodiment, the gNB 410 includes at least one processor and at least one memory. The at least one memory includes computer program codes. The at least one memory and the computer program codes are configured to be used in collaboration with the at least one processor. The gNB 410 at least transmits L reference signal groups and receives a first radio signal in a first time window. Herein, the first radio signal is used for determining K difference value(s), and the K difference value(s) is (are one-to-one) corresponding to K reference power(s). The reference power is a power estimated for transmission of an uplink channel. Measurement(s) for K antenna port group(s) are used for determining the K reference power(s respectively). The first radio signal is used for determining position(s) of the K antenna port group(s) in L antenna port groups. The antenna port group includes a positive integer number of antenna port(s). All antenna ports in the L antenna port groups are used for one same serving cell, or all antenna ports in the L antenna port groups are used for one same carrier. The K is a positive integer, the L is a positive integer not less than the K, and the L is greater than 1. The L reference signal groups are transmitted by L antenna port groups respectively. Each of the L reference signal groups includes a positive integer number of reference signal(s), and reference signal(s) in the each reference signal group is (are one-to-one) corresponding to antenna port(s) in a corresponding transmitting antenna port group.

In one embodiment, the gNB 410 includes a memory that stores a computer readable instruction program. The computer readable instruction program generates an action when executed by at least one processor. The action includes transmitting L reference signal groups and receiving a first radio signal in a first time window. Herein, the first radio signal is used for determining K difference value(s), and the K difference value(s) is (are one-to-one) corresponding to K reference power(s). The reference power is a power estimated for transmission of an uplink channel. Measurement(s) for K antenna port group(s) are used for determining the K reference power(s respectively). The first radio signal is used for determining position(s) of the K antenna port group(s) in L antenna port groups. The antenna port group includes a positive integer number of antenna port(s). All antenna ports in the L antenna port groups are used for one same serving cell, or all antenna ports in the L antenna port groups are used for one same carrier. The K is a positive integer, the L is a positive integer not less than the K, and the L is greater than 1. The L reference signal groups are transmitted by L antenna port groups respectively. Each of the L reference signal groups includes a positive integer number of reference signal(s), and reference signal(s) in the each reference signal group is (are one-to-one) corresponding to antenna port(s) in a corresponding transmitting antenna port group.

In one embodiment, the UE 450 corresponds to the UE in the disclosure.

In one embodiment, the gNB 410 corresponds to the base station in the disclosure.

In one embodiment, the first receiver 501 mentioned in Embodiment 6 of the disclosure includes the antenna 460, the receiver 456 and the receiving processor 452.

In one embodiment, the first receiver 601 mentioned in Embodiment 6 of the disclosure includes the controller/processor 490 and the memory 467.

In one embodiment, the first transmitter 602 mentioned in Embodiment 6 of the disclosure includes the antenna 460, the transmitter 456 and the transmitting processor 455.

In one embodiment, the first transmitter 602 mentioned in Embodiment 6 of the disclosure includes the controller/processor 490 and the data source 467.

In one embodiment, the second transmitter 701 mentioned in Embodiment 7 of the disclosure includes the antenna 420, the transmitter 416 and the transmitting processor 415.

In one embodiment, the second transmitter 701 mentioned in Embodiment 7 of the disclosure includes the controller/processor 440.

In one embodiment, the second receiver 702 mentioned in Embodiment 7 of the disclosure includes the antenna 420, the receiver 416 and the receiving processor 412.

In one embodiment, the second receiver 702 mentioned in Embodiment 7 of the disclosure includes the controller/processor 440 and the memory 430.

The ordinary skill in the art may understand that all or part steps in the above method may be implemented by instructing related hardware through a program. The program may be stored in a computer readable storage medium, for example Read-Only Memory (ROM), hard disk or compact disc, etc. Optionally, all or part steps in the above embodiments also may be implemented by one or more integrated circuits. Correspondingly, each module unit in the above embodiment may be realized in the form of hardware, or in the form of software function modules. The disclosure is not limited to any combination of hardware and software in specific forms. The UE or terminal in the disclosure includes but not limited to mobile phones, tablet computers, notebooks, network cards, Internet of Things (IOT) communication modules, vehicle-mounted communication equipment, NB-IOT equipment, eMTC terminals, and other wireless communication equipment. The base station or system equipment in the disclosure includes but not limited to macro-cellular base stations, micro-cellular base stations, home base stations, relay base stations, and other radio communication equipment.

The above are merely the preferred embodiments of the disclosure and are not intended to limit the scope of protection of the disclosure. Any modification, equivalent substitute and improvement made within the spirit and principle of the disclosure are intended to be included within the scope of protection of the disclosure.

What is claimed is:

1. A method in a User Equipment (UE) for power adjustment, comprising:
   receiving R downlink signalings; and
   transmitting a first radio signal in a first time window;
   wherein the first radio signal is used for determining K difference value(s), and the K difference value(s) is (are one-to-one) corresponding to K reference power(s); the reference power is a power estimated for transmission of an uplink channel; measurement(s) for K antenna port group(s) are used for determining the K reference power(s respectively); the first radio signal is used for determining position(s) of the K antenna port group(s) in L antenna port groups; the antenna port group comprises a positive integer number of antenna ports; all antenna ports in the L antenna port groups are used for one same serving cell, or all antenna ports in the L antenna port groups are used for one same carrier; the K is a positive integer, the L is a positive integer not less than the K, and the L is greater than 1; each of the R downlink signalings comprises a first field and a second field; the R downlink signalings are used for one same serving cell, or, the R downlink signalings are used for one same carrier; the K reference power(s) is (are one-to-one) corresponding to K index(es); for any one given reference power among the K reference power(s), the R downlink signalings comprise a total number of R1 downlink signalings in which the first fields have values equal to the index corresponding to the given reference power, the given reference power is in linear correlation with a summation of R1 power offsets, and the R1 power offsets are indicated by the second fields in the R1 downlink signalings respectively; the R is a positive integer, and the R1 is a positive integer not greater than the R; and Each of the K index(es) is an integer.

2. The method according to claim 1, wherein each of the K difference value(s) is equal to a difference between a first power and a corresponding reference power; or a first difference value is equal to a difference between a second power and a corresponding reference power, and each of the K difference value(s) other than the first difference value is equal to a difference between a first power and a corresponding reference power; or the K difference value(s) is (are one-to-one) corresponding to K target power(s), and the difference value is equal to a difference between a corresponding target power and a corresponding reference power.

3. The method according to claim 1, further comprising:
   receiving L reference signal groups;
   wherein the L reference signal groups are transmitted by L antenna port groups respectively; each of the L reference signal groups comprises a positive integer number of reference signal(s), and reference signal(s) in the each reference signal group is (are one-to-one) corresponding to antenna port(s) in a corresponding transmitting antenna port group;
   receiving a first signaling;
   wherein the first signaling indicates a time duration of a first timer, and the expiration of the first timer is used for triggering reporting of the K difference value(s); or,
   receiving a second signaling;
   wherein the second signaling is used for determining a specific threshold; measurements for the L reference signal groups are used for determining L path losses respectively; the specific threshold is used for determining the K antenna port group(s) from the L antenna port groups; and K path loss(es) among the L path losses is (are) used for determining the K reference power(s respectively).

4. The method according to claim 1, wherein a third signaling is the latest downlink signaling among the R downlink signalings, the third signaling comprises scheduling information of the first radio signal, and the scheduling information comprises at least one of {occupied time domain resources, occupied frequency domain resources, a Modulation and Coding Scheme (MCS), a Hybrid Automatic Repeat reQuest (HARQ) process number, a Redundancy Version (RV), a New Data Indicator (NDI)}.

5. The method according to claim 1, wherein the first radio signal is used for determining at least one of {the K, first indication information}, the first indication information being applied to the K difference values; and the first indication information indicates whether a MAC entity employs power backoff, and the K is greater than 1; or, the K reference powers comprise at most one reference power, that is, a first reference power, the first reference power is in linear correlation with at least one of {a first component, a third component}, the first component is related to a bandwidth occupied by the first radio signal, and the third component is related to an MCS of the first radio signal.

6. A method in a base station for power adjustment, comprising:

transmitting R downlink signalings; and
receiving a first radio signal in a first time window;
wherein the first radio signal is used for determining K difference value(s), and the K difference value(s) is (are one-to-one) corresponding to K reference power(s); the reference power is a power estimated for transmission of an uplink channel; measurement(s) for K antenna port group(s) are used for determining the K reference power(s respectively); the first radio signal is used for determining position(s) of the K antenna port group(s) in L antenna port groups; the antenna port group comprises a positive integer number of antenna ports; all antenna ports in the L antenna port groups are used for one same serving cell, or all antenna ports in the L antenna port groups are used for one same carrier; the K is a positive integer, the L is a positive integer not less than the K, and the L is greater than 1; each of the R downlink signalings comprises a first field and a second field; the R downlink signalings are used for one same serving cell, or, the R downlink signalings are used for one same carrier; the K reference power(s) is (are one-to-one) corresponding to K index(es); for any one given reference power among the K reference power(s), the R downlink signalings comprise a total number of R1 downlink signalings in which the first fields have values equal to the index corresponding to the given reference power, the given reference power is in linear correlation with a summation of R1 power offsets, and the R1 power offsets are indicated by the second fields in the R1 downlink signalings respectively; the R is a positive integer, and the R1 is a positive integer not greater than the R; and Each of the K index(es) is an integer.

7. The method according to claim 6, wherein each of the K difference value(s) is equal to a difference between a first power and a corresponding reference power; or a first difference value is equal to a difference between a second power and a corresponding reference power, and each of the K difference value(s) other than the first difference value is equal to a difference between a first power and a corresponding reference power; or the K difference value(s) is (are one-to-one) corresponding to K target power(s), and the difference value is equal to a difference between a corresponding target power and a corresponding reference power.

8. The method according to claim 6, further comprising:

transmitting L reference signal groups;
wherein the L reference signal groups are transmitted by L antenna port groups respectively; each of the L reference signal groups comprises a positive integer number of reference signal(s), and reference signal(s) in the each reference signal group is (are one-to-one) corresponding to antenna port(s) in a corresponding transmitting antenna port group;
transmitting a first signaling;
wherein the first signaling indicates a time duration of a first timer, and the expiration of the first timer is used for triggering reporting of the K difference value(s); or,
transmitting a second signaling;
wherein the second signaling is used for determining a specific threshold; measurements for the L reference signal groups are used for determining L path losses respectively; the specific threshold is used for determining the K antenna port group(s) from the L antenna port groups; and K path loss(es) among the L path losses is (are) used for determining the K reference power(s respectively).

9. The method according to claim 6, wherein a third signaling is the latest downlink signaling among the R downlink signalings, the third signaling comprises scheduling information of the first radio signal, and the scheduling information comprises at least one of {occupied time domain resources, occupied frequency domain resources, an MCS, a HARQ process number, an RV, an NDI}.

10. The method according to claim 6, wherein the first radio signal is used for determining at least one of {the K, first indication information}, the first indication information being applied to the K difference values; and the first indication information indicates whether a MAC entity employs power backoff, and the K is greater than 1.

11. A UE for power adjustment, comprising:

a first receiver, to receive R downlink signalings; and
a first transmitter, to transmit a first radio signal in a first time window;
wherein the first radio signal is used for determining K difference value(s), and the K difference value(s) is (are one-to-one) corresponding to K reference power(s); the reference power is a power estimated for transmission of an uplink channel; measurement(s) for K antenna port group(s) are used for determining the K reference power(s respectively); the first radio signal is used for determining position(s) of the K antenna port group(s) in L antenna port groups; the antenna port group comprises a positive integer number of antenna ports; all antenna ports in the L antenna port groups are used for one same serving cell, or all antenna ports in the L antenna port groups are used for one same carrier; the K is a positive integer, the L is a positive integer not less than the K, and the L is greater than 1; each of the R downlink signalings comprises a first field and a second field; the R downlink signalings are used for one same serving cell, or, the R downlink signalings are used for one same carrier; the K reference power(s) is (are one-to-one) corresponding to K index(es); for any one given reference power among the K reference power(s), the R downlink signalings comprise a total number of R1 downlink signalings in which the first fields have values equal to the index corresponding to the given reference power, the given reference power is in linear correlation with a summation of R1 power offsets, and the R1 power offsets are indicated by the second fields in the R1 downlink signalings respectively; the R is a positive integer, and the R1 is a positive integer not greater than the R; and Each of the K index(es) is an integer.

12. The UE according to claim 11, wherein each of the K difference value(s) is equal to a difference between a first power and a corresponding reference power; or a first difference value is equal to a difference between a second power and a corresponding reference power, and each of the K difference value(s) other than the first difference value is equal to a difference between a first power and a corresponding reference power; or the K difference value(s) is (are one-to-one) corresponding to K target power(s), and the difference value is equal to a difference between a corresponding target power and a corresponding reference power.

13. The UE according to claim 11, wherein the first receiver receives L reference signal groups; wherein the L reference signal groups are transmitted by L antenna port groups respectively; each of the L reference signal groups comprises a positive integer number of reference signal(s), and reference signal(s) in the each reference signal group is (are one-to-one) corresponding to antenna port(s) in a corresponding transmitting antenna port group;
the first receiver receives a first signaling; wherein the first signaling indicates a time duration of a first timer, and the expiration of the first timer is used for triggering reporting of the K difference value(s); or,
the first receiver receives a second signaling; wherein the second signaling is used for determining a specific threshold; measurements for the L reference signal groups are used for determining L path losses respectively; the specific threshold is used for determining the K antenna port group(s) from the L antenna port groups; and K path loss(es) among the L path losses is (are) used for determining the K reference power(s respectively).

14. The UE according to claim 11, wherein a third signaling is the latest downlink signaling among the R downlink signalings, the third signaling comprises scheduling information of the first radio signal, and the scheduling information comprises at least one of {occupied time domain resources, occupied frequency domain resources, an MCS, a HARQ process number, an RV, an NDI}.

15. The UE according to claim 11, wherein the first radio signal is used for determining at least one of {the K, first indication information}, the first indication information being applied to the K difference values; and the first indication information indicates whether a MAC entity employs power backoff, and the K is greater than 1; or,
the K reference powers comprise at most one reference power, that is, a first reference power, the first reference power is in linear correlation with at least one of {a first component, a third component}, the first component is related to a bandwidth occupied by the first radio signal, and the third component is related to an MCS of the first radio signal.

16. A base station for power adjustment, comprising:
a second transmitter, to transmit R downlink signalings; and
a second receiver, to receive a first radio signal in a first time window;
wherein the first radio signal is used for determining K difference value(s), and the K difference value(s) is (are one-to-one) corresponding to K reference power(s); the reference power is a power estimated for transmission of an uplink channel; measurement(s) for K antenna port group(s) are used for determining the K reference power(s respectively); the first radio signal is used for determining position(s) of the K antenna port group(s) in L antenna port groups; the antenna port group comprises a positive integer number of antenna ports; all antenna ports in the L antenna port groups are used for one same serving cell, or all antenna ports in the L antenna port groups are used for one same carrier; the K is a positive integer, the L is a positive integer not less than the K, and the L is greater than 1; each of the R downlink signalings comprises a first field and a second field; the R downlink signalings are used for one same serving cell, or, the R downlink signalings are used for one same carrier; the K reference power(s) is (are one-to-one) corresponding to K index(es); for any one given reference power among the K reference power(s), the R downlink signalings comprise a total number of R1 downlink signalings in which the first fields have values equal to the index corresponding to the given reference power, the given reference power is in linear correlation with a summation of R1 power offsets, and the R1 power offsets are indicated by the second fields in the R1 downlink signalings respectively; the R is a positive integer, and the R1 is a positive integer not greater than the R; and Each of the K index(es) is an integer.

17. The base station according to claim 16, wherein each of the K difference value(s) is equal to a difference between a first power and a corresponding reference power; or a first difference value is equal to a difference between a second power and a corresponding reference power, and each of the K difference value(s) other than the first difference value is equal to a difference between a first power and a corresponding reference power; or the K difference value(s) is (are one-to-one) corresponding to K target power(s), and the difference value is equal to a difference between a corresponding target power and a corresponding reference power.

18. The base station according to claim 16, wherein the second transmitter transmits L reference signal groups; wherein the L reference signal groups are transmitted by L antenna port groups respectively; each of the L reference signal groups comprises a positive integer number of reference signal(s), and reference signal(s) in the each reference signal group is (are one-to-one) corresponding to antenna port(s) in a corresponding transmitting antenna port group;
the second transmitter transmits a first signaling; wherein the first signaling indicates a time duration of a first timer, and the expiration of the first timer is used for triggering reporting of the K difference value(s); or,
the second transmitter transmits a second signaling; wherein the second signaling is used for determining a specific threshold; measurements for the L reference signal groups are used for determining L path losses respectively; the specific threshold is used for determining the K antenna port group(s) from the L antenna port groups; and K path loss(es) among the L path losses is (are) used for determining the K reference power(s respectively).

19. The base station according to claim 16, wherein a third signaling is the latest downlink signaling among the R downlink signalings, the third signaling comprises scheduling information of the first radio signal, and the scheduling information comprises at least one of {occupied time domain resources, occupied frequency domain resources, an MCS, a HARQ process number, an RV, an NDI}.

20. The base station according to claim 16, wherein the first radio signal is used for determining at least one of {the K, first indication information}, the first indication information being applied to the K difference values; and the first indication information indicates whether a MAC entity employs power backoff, and the K is greater than 1.

* * * * *